(12) United States Patent
Wang et al.

(10) Patent No.: US 11,561,660 B2
(45) Date of Patent: Jan. 24, 2023

(54) DISPLAY APPARATUSES AND SELF-CAPACITANCE TOUCH PANELS THEREOF

(71) Applicant: BOE Technology Group Co., Ltd., Beijing (CN)

(72) Inventors: Jiuzhen Wang, Beijing (CN); Lina Liu, Beijing (CN); Zewen Bo, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/386,345

(22) Filed: Jul. 27, 2021

(65) Prior Publication Data

US 2022/0035487 A1    Feb. 3, 2022

(30) Foreign Application Priority Data

Jul. 29, 2020    (CN) .......................... 202010747076.6

(51) Int. Cl.
*G06F 3/044*    (2006.01)
*G06F 3/041*    (2006.01)
*G09G 3/3208*    (2016.01)

(52) U.S. Cl.
CPC .......... *G06F 3/0446* (2019.05); *G06F 3/0412* (2013.01); *G06F 3/0443* (2019.05); *G06F 2203/04102* (2013.01); *G09G 3/3208* (2013.01); *G09G 2300/0439* (2013.01)

(58) Field of Classification Search
CPC .... G06F 3/0446; G06F 3/0412; G06F 3/0443; G06F 2203/04102; G06F 3/044; G09G 3/3208; G09G 2300/0439; G09G 3/3225
See application file for complete search history.

(56) References Cited

U.S. PATENT DOCUMENTS

| | | | |
|---|---|---|---|
| 2016/0357310 A1* | 12/2016 | Wang | G06F 3/0412 |
| 2016/0370919 A1* | 12/2016 | Xu | G06F 3/0443 |
| 2017/0115784 A1* | 4/2017 | Li | G02F 1/13338 |
| 2018/0033834 A1* | 2/2018 | Jun | G06F 3/0412 |

* cited by examiner

*Primary Examiner* — Md Saiful A Siddiqui
(74) *Attorney, Agent, or Firm* — IPro, PLLC

(57) ABSTRACT

Display apparatuses and self-capacitance touch panels thereof are provided. A self-capacitance touch panel includes a touch wiring layer and a signal transmission wiring layer. The touch wiring layer includes a plurality of touch units arranged in an array, each of which includes a plurality of touch lines electrically connected. The signal transmission wiring layer includes a plurality of signal transmission lines extending in a row direction or a column direction, at least one of which is electrically connected with a corresponding one of the touch units and electrically insulated from the rest of the touch units in an extending direction thereof. At least a portion of an orthographic projection of the signal transmission line in a plane where the self-capacitance touch panel is located is misaligned with an orthographic projection of each of the touch lines of the touch units electrically insulated from the signal transmission line in the plane.

10 Claims, 18 Drawing Sheets

DISPLAY APPARATUSES AND SELF-CAPACITANCE TOUCH PANELS THEREOF

CROSS-REFERENCE TO RELATED APPLICATIONS

The present disclosure claims priority to Chinese patent application No. 202010747076.6 filed on Jul. 29, 2020, and entitled "DISPLAY APPARATUSES AND SELF-CAPACITANCE TOUCH PANELS THEREOF", which is incorporated herein by reference in its entirety.

TECHNICAL FIELD

Embodiments of the present disclosure relate to a display apparatus and self-capacitance touch panel thereof.

BACKGROUND

With the emergence and continuous development of OLED (Organic Light-Emitting Diode) display technology, flexible display has become the future development trend of display. Flexible screens that are bendable and rollable have been widely used in mobile phones and tablet computers, which require touch layers to have a bending performance. Therefore, the structure the current AMOLED (Active-Matrix Organic Light-Emitting Diode) panel has been changed from an out-cell mutual-capacitance structure to an on-cell mutual-capacitance structure.

The on-cell mutual-capacitance structure is very close to a cathode of the AMOLED panel, and as the size of the panel becomes larger and the cover becomes thinner, a parasitic capacitance of the mutual-capacitance structure may become larger and the SNR (Signal Noise Ratio) of touch may become lower, which requires ICs to have a higher capability to detect a touch position of a finger. Since an on-cell self-capacitance structure has a different principle of touch-scanning from that of the mutual-capacitance structure, and thus can overcome defects of the mutual-capacitance structure, the current FMLOC (Flexible Metal-layer on cell) touch panel with a large size tends to use the on-cell self-capacitance structure.

SUMMARY

At least one embodiment of the present disclosure provides a self-capacitance touch panel including a touch wiring layer and a signal transmission wiring layer, where the touch wiring layer includes a plurality of touch units arranged in an array, and each of the touch units includes a plurality of touch lines electrically connected together; the signal transmission wiring layer includes a plurality of signal transmission lines extending in a row direction or a column direction, and at least one of the signal transmission lines is electrically connected with a corresponding one of the touch units and electrically insulated from the rest of the touch units in an extending direction thereof; and at least a portion of an orthographic projection of the signal transmission line in a plane where the self-capacitance touch panel is located is misaligned with an orthographic projection of each of the touch lines of the touch units electrically insulated from the signal transmission line in the plane where the self-capacitance touch panel is located.

In some embodiments of the present disclosure, the self-capacitance touch panel includes a plurality of pixel units arranged in an array; an orthographic projection of each of the touch lines in the plane where the self-capacitance touch panel is located is located between orthographic projections of corresponding adjacent pixel units in the plane where the self-capacitance touch panel is located; an orthographic projection of each of the signal transmission lines in the plane where the self-capacitance touch panel is located is located between orthographic projections of corresponding adjacent pixel units in the plane where the self-capacitance touch panel is located; and the touch unit includes the touch lines between multiple of the plurality of pixel units.

In some embodiments of the present disclosure, the signal transmission line is provided between the pixel units in a Pth column and the pixel units in a (P+1)th column in the column direction, and includes a first straight line segment and a first oblique line segment, the first straight line segment extends in the column direction, and the first oblique line segment extends at an angle with respect to the column direction; and P is a positive integer.

In some embodiments of the present disclosure, the signal transmission line is provided between the pixel units in a Pth column and the pixel units in a (P+1)th column in the column direction, and includes a first straight line segment and a first oblique line segment, the first straight line segment extends in the column direction, and the first oblique line segment extends at an angle with respect to the column direction; the touch line is provided between the pixel units in the P-th column and the pixel units in the (P+1)th column and includes a second oblique line segment, and the second oblique line segment extends at an angle with respect to the column direction; an orthographic projection of the first oblique line segment in the plane where the self-capacitance touch panel is located is misaligned with an orthographic projection of the second oblique line segment in the plane where the self-capacitance touch panel is located; and P is a positive integer.

In some embodiments of the present disclosure, the signal transmission lines extend in the column direction, the signal transmission line located between the pixel units in a Pth column and the pixel units in a (P+1)th column includes a first straight line segment and a first oblique line segment, the first straight line segment extends in the column direction, and the first oblique line segment extends at an angle with respect to the column direction; the touch line located between the pixel units in the P-th column and the pixel units in the (P+1)th column includes a second straight line segment and a second oblique line segment, the second straight line segment extends in the column direction, and the second oblique line segment extends at an angle with respect to the column direction; the orthographic projection of the signal transmission line in the plane where the self-capacitance touch panel is located and the orthographic projection of the touch line in the plane where the self-capacitance touch panel is located satisfy at least one of: an orthographic projection of the first straight line segment in the plane where the self-capacitance touch panel is located is misaligned with an orthographic projection of the second straight line segment in the plane where the self-capacitance touch panel is located, or an orthographic projection of the first oblique line segment in the plane where the self-capacitance touch panel is located is misaligned with an orthographic projection of the second oblique line segment in the plane where the self-capacitance touch panel is located; and P is a positive integer.

In some embodiments of the present disclosure, the signal transmission line is provided between the pixel units in a Qth row and the pixel units in a (Q+1)th row in the row direction, and includes a first straight line segment and a first oblique line segment, the first straight line segment extends in the row direction, and the first oblique line segment extends at an angle with respect to the row direction; and Q is a positive integer.

In some embodiments of the present disclosure, the signal transmission line is provided between the pixel units in a Qth row and the pixel units in a (Q+1)th row in the row direction, and includes a first straight line segment and a first oblique line segment, the first straight line segment extends in the row direction, and the first oblique line segment extends at an angle with respect to the row direction; the touch line is provided between the pixel units in the Q-th row and the pixel units in the (Q+1)th row and includes a second oblique line segment, and the second oblique line segment extends at an angle with respect to the row direction; an orthographic projection of the first oblique line segment in the plane where the self-capacitance touch panel is located is misaligned with an orthographic projection of the second oblique line segment in the plane where the self-capacitance touch panel is located; and Q is a positive integer.

In some embodiments of the present disclosure, the signal transmission lines extend in the row direction, the signal transmission line located between the pixel units in a Qth row and the pixel units in a (Q+1)th row includes a first straight line segment and a first oblique line segment, the first straight line segment extends in the row direction, and the first oblique line segment extends at an angle with respect to the row direction; the touch line located between the pixel units in the Q-th row and the pixel units in the (Q+1)th row includes a second straight line segment and a second oblique line segment, the second straight line segment extends in the row direction, and the second oblique line segment extends at an angle with respect to the row direction; the orthographic projection of the signal transmission line in the plane where the self-capacitance touch panel is located and the orthographic projection of the touch line in the plane where the self-capacitance touch panel is located satisfy at least one of: an orthographic projection of the first straight line segment in the plane where the self-capacitance touch panel is located is misaligned with an orthographic projection of the second straight line segment in the plane where the self-capacitance touch panel is located, or an orthographic projection of the first oblique line segment in the plane where the self-capacitance touch panel is located is misaligned with an orthographic projection of the second oblique line segment in the plane where the self-capacitance touch panel is located; and Q is a positive integer.

In some embodiments of the present disclosure, the touch wiring layer includes the plurality of touch units arranged in M rows and N columns, and the signal transmission wiring layer includes M*N signal transmission lines extending in the column direction; M touch units in a column correspond to M signal transmission lines, one of the M signal transmission lines is electrically connected with the touch lines of a corresponding one of the M touch units in the column, remaining signal transmission lines of the M signal transmission lines are electrically insulated from the touch lines of the corresponding touch unit; at least a portion of orthographic projections of the remaining signal transmission lines in the plane where the self-capacitance touch panel is located are misaligned with an orthographic projection of each of the touch lines of the corresponding touch unit in the plane where the self-capacitance touch panel is located; and M and N are positive integers greater than or equal to 2, respectively.

In some embodiments of the present disclosure, the touch wiring layer includes the plurality of touch units arranged in M rows and N columns, and the signal transmission wiring layer includes M*N signal transmission lines extending in the row direction; N touch units in a row correspond to N signal transmission lines, one of the N signal transmission lines is electrically connected with the touch lines of a corresponding one of the N touch units in the row, remaining signal transmission lines of the N signal transmission lines are electrically insulated from the touch lines of the corresponding touch unit; at least a portion of orthographic projections of the remaining signal transmission lines in the plane where the self-capacitance touch panel is located are misaligned with an orthographic projection of each of the touch lines of the corresponding touch unit in the plane where the self-capacitance touch panel is located; and M and N are positive integers greater than or equal to 2, respectively.

In some embodiments of the present disclosure, the plurality of signal transmission lines and the plurality of touch lines are made of molybdenum.

At least one embodiment of the present disclosure provides a display apparatus including the self-capacitance touch panel described above.

BRIEF DESCRIPTION OF THE DRAWINGS

The drawings herein, which are incorporated into the specification and constitute a part of the specification, illustrate embodiments in accordance with the present disclosure, and are used together with the specification to explain the principle of the present disclosure.

DETAILED DESCRIPTION OF THE EMBODIMENTS

Figure 1:
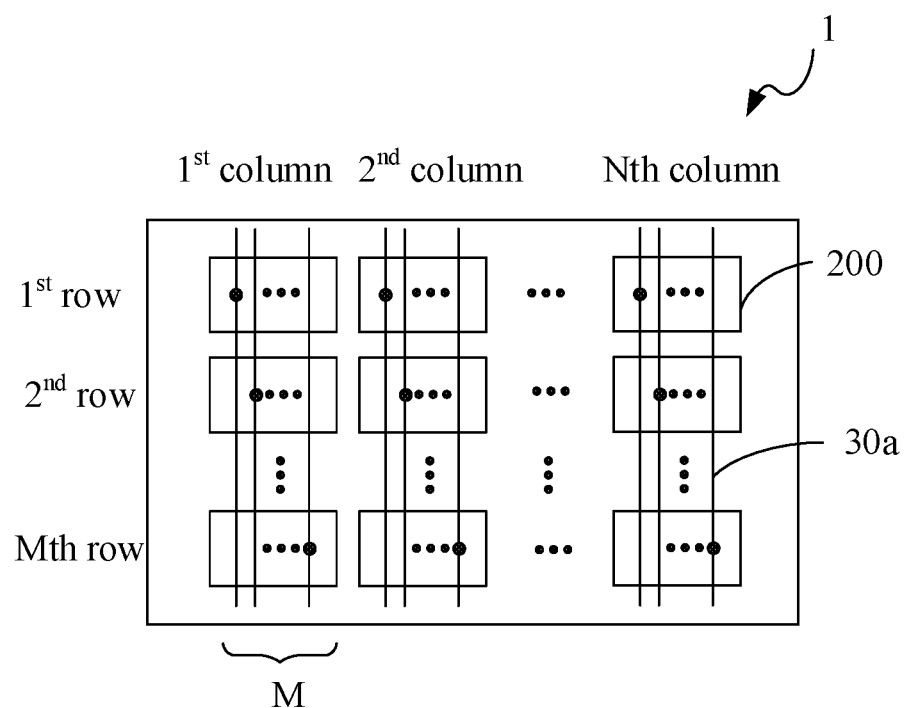
FIG. 1 illustrates a schematic top view of a structure of a self-capacitance touch panel according to an embodiment of the present disclosure.

Example embodiments will be described in detail herein, and examples thereof are illustrated in the drawings. When the following description refers to the drawings, the same numbers in different drawings indicate the same or similar elements, unless otherwise indicated. The implementations described in the following example embodiments do not represent all implementations in accordance with the present disclosure. Rather, they are merely examples of apparatuses and methods in accordance with some aspects of the present disclosure as detailed in the appended claims.

Figure 2:
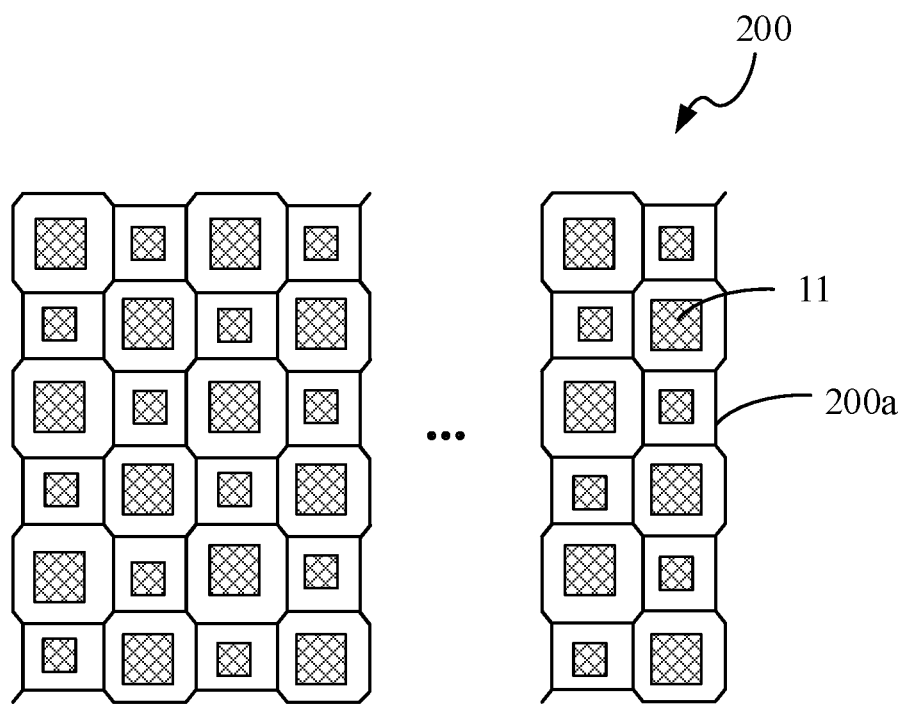
FIG. 2 illustrates an enlarged view of a touch unit in FIG. 1.
Figure 3:
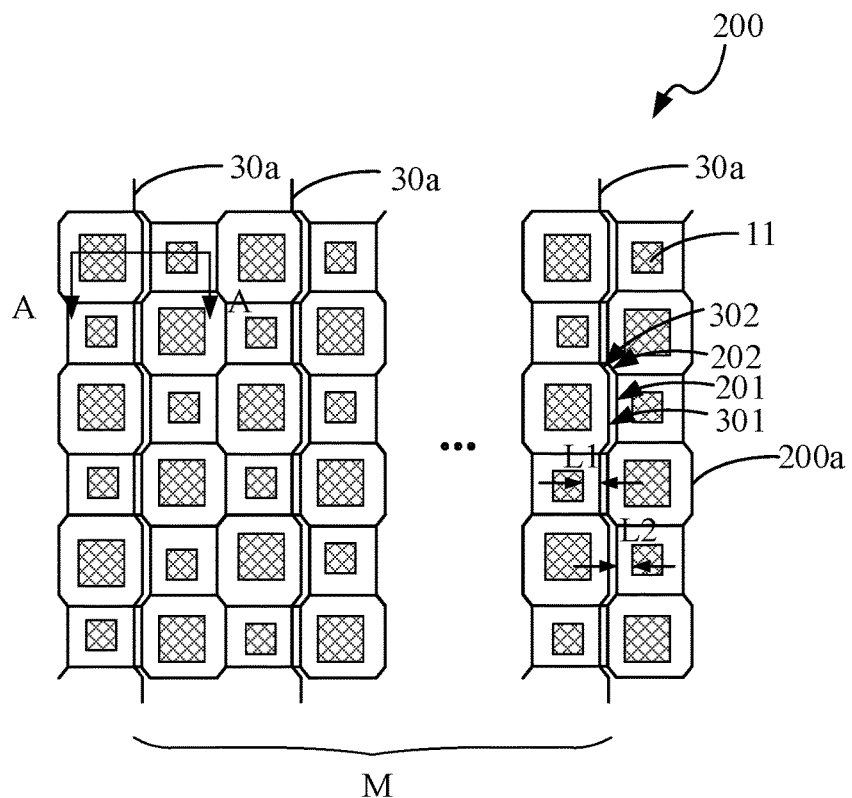
FIG. 3 illustrates a structure with signal transmission lines added to the structure shown in FIG. 2.
Figure 4:
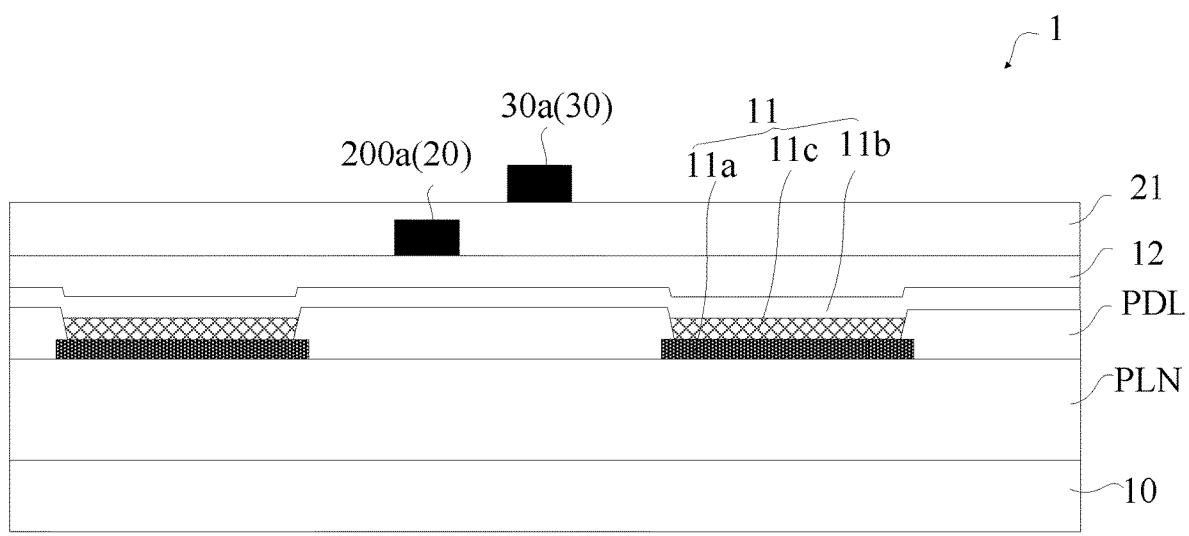
FIG. 4 illustrates a cross-sectional view along a line AA in FIG. 3.

FIG. 1 illustrates a schematic top view of a structure of a self-capacitance touch panel according to an embodiment of the present disclosure. FIG. 2 illustrates an enlarged view of a touch unit in FIG. 1. FIG. 3 illustrates a structure with signal transmission lines added to the structure shown in FIG. 2. FIG. 4 illustrates a cross-sectional view along a line AA in FIG. 3.

Referring to FIGS. 1 to 4, the self-capacitance touch panel 1 includes a touch wiring layer 20 and a signal transmission wiring layer 30. The touch wiring layer 20 includes a plurality of touch units 200 arranged in an array, and each of the touch units 200 includes a plurality of touch lines 200a electrically connected together. The signal transmission wiring layer 30 includes a plurality of signal transmission lines 30a extending in a column direction. Each of the signal transmission lines 30a is electrically connected with one of the touch units 200 and electrically insulated from the rest of the touch units 200 in an extending direction thereof, and at least a portion of an orthographic projection of the signal transmission line 30a in a plane where the self-capacitance touch panel 1 is located is misaligned with an orthographic projection of each of the touch lines 200a of the touch units 200 electrically insulated from the signal transmission line 30a in the plane where the self-capacitance touch panel 1 is located.

Referring to FIG. 4, in an embodiment of the present disclosure, the self-capacitance touch panel 1 may include a substrate 10. The substrate 10 may be a flexible substrate or a rigid substrate. The flexible substrate may be made of polyimide, and the rigid substrate may be made of glass.

A planarization layer PLN may be provided on the substrate 10. A plurality of first electrodes 11a may be provided on a side of the planarization layer PLN away from the substrate 10. A pixel definition layer PDL may be provided on the first electrodes 11a and an area of the planarization layer PLN that is not covered with the first electrodes 11a. The pixel definition layer PDL may have a plurality of openings exposing a portion of the first electrodes 11a, and a light-emitting block 11c may be provided in each opening. A second electrode 11b may be provided on the light-emitting blocks 11c and the pixel definition layer PDL.

The first electrodes 11a, the light-emitting blocks 11c and the second electrode 11b may form a plurality of pixel units 11 arranged in an array.

The light-emitting block 11c may be red, green or blue, or may be red, green, blue or white. The pixel units 11 with three primary colors of red, green, and blue, or with four primary colors of red, green, blue, and white may be alternately distributed. The light-emitting block 11c may be made of an organic light-emitting material (OLED).

The first electrodes 11a may be an anode, and may be made of a light-transmitting material or a retro-reflective material. The light-transmitting material may include at least one of indium tin oxide (ITO), indium zinc oxide (IZO), or indium gallium zinc oxide (IGZO). The retro-reflective material may include silver (Ag) and alloys thereof, and aluminum (Al) and alloys thereof, such as silver (Ag), an alloy of silver and lead (Ag:Pb), an alloy of aluminum and neodymium (Al:Nd), and an alloy of silver, platinum and copper (Ag:Pt:Cu).

The second electrode 11b may be a cathode, and may be made of a transflective material or a retro-reflective material. The transflective material may include at least one of magnesium, silver or aluminum, such as a mixture of magnesium and silver, or a mixture of aluminum and silver. The retro-reflective material may include at least one of indium tin oxide (ITO), indium zinc oxide (IZO), or indium gallium zinc oxide (IGZO). For instance, the self-capacitance touch panel 1 may have a top emission type or a bottom emission type, which is not limited in the embodiments of the present disclosure.

Second electrodes 11b of respective pixel units 11 may be connected as a surface electrode to facilitate power supply to the second electrodes 11b.

In some embodiments of the present disclosure, a light-emitting mode of the pixel units 11 may include AM (Active Matrix). AM is known as an active driving mode in which the pixel units 11 are controlled to emit light by pixel driving circuits. Thus, pixel driving circuits may be provided between the first electrodes 11a and the substrate 10. Each of the pixel driving circuits may include a plurality of transistors and a storage capacitor, where the drain of one of the transistors is electrically connected with the first electrode 11a.

For example, in an embodiment of the present disclosure, the pixel driving circuit may have a 2T1C structure, including a switching transistor, a driving transistor, and a storage capacitor.

The gate of the switching transistor may be electrically connected with a scanning signal line. When the scanning signal line carries a scanning signal indicative of a turn-on voltage, the switching transistor may hold a data signal carried on a data signal line at a plate of the storage capacitor; and when the scanning signal is indicative of a turn-off voltage, the data signal held at the storage capacitor may keep the driving transistor on, such that the first electrode 11a of the pixel unit 11 may be powered continuously via a power signal on a power signal line.

An extending direction of the scanning signal line may be perpendicular to an extending direction of the data signal line. An extending direction of the power signal line may be parallel to the extending direction of the data signal line.

In some embodiments of the present disclosure, the light-emitting mode of the pixel units 11 may include PM (Passive Matrix). PM is known as a passive driving mode in which strip-shaped electrodes arranged in intersecting rows and columns apply a voltage to the pixel units 11 at intersections of the rows and columns to make the pixel units 11 emit light. Thus, there are no pixel driving circuits provided between the first electrodes 11a and the substrate 10. In the passive driving mode, the first electrodes 11a of each column of pixel units 11 may be connected to a column scanning line of a driver chip, and the second electrodes 11b of each row of pixel units 11 may be connected to a row scanning line of the driver chip, with the column scanning line and the row scanning line providing a driving voltage to the pixel units 11 at the intersections.

An encapsulation layer 12 may be provided on a side of the second electrode 11b away from the substrate 10. The encapsulation layer 12, such as a TFE film, may include a structure in which a plurality of organic encapsulation layers and inorganic encapsulation layers are overlapped.

A touch layer may be provided on a side of the encapsulation layer 12 away from the substrate 10. For a touch layer of a self-capacitance structure, it may include a touch wiring layer 20 and a signal transmission wiring layer 30. The touch wiring layer 20 and the signal transmission wiring layer 30 are located in different layers, and are electrically insulated from each other by an insulating layer 21.

In the embodiment shown in FIG. 4, the touch wiring layer 20 is located close to the substrate 10, and the signal transmission wiring layer 30 is located away from the substrate 10. In some other embodiments of the present disclosure, the signal transmission wiring layer 30 is located close to the substrate 10 and the touch wiring layer 20 is located away from the substrate 10.

In an embodiment of the present disclosure, the touch wiring layer 20 and the signal transmission wiring layer 30 may be made of an opaque metal, such as molybdenum. Thus, the touch wiring layer 20 and the signal transmission wiring layer 30 are provided between adjacent pixel units 11. In some embodiments of the present disclosure, the touch wiring layer 20 and the signal transmission wiring layer 30 may be made of a light-transmitting conductive material, such as at least one of indium tin oxide (ITO), indium zinc oxide (IZO), or indium gallium zinc oxide (IGZO).

Referring to FIGS. 2 and 3, in an embodiment of the present disclosure, the touch lines 200a are distributed in a grid pattern, and are provided between any two adjacent pixel units 11. One of the touch units 200 includes the touch lines 200a between multiple of the pixel units 11. When a user touches the self-capacitance touch panel 1, the denser the distribution of the touch lines 200a in one touch unit 200, the greater the capacitance change, and the easier it is to detect touch signals.

Referring again to FIG. 1, the touch units 200 may be arranged in M rows and N columns, where M and N are positive integers greater than or equal to 2, respectively.

Referring to FIGS. 1, 3 and 4, the signal transmission wiring layer 30 may include M*N signal transmission lines 30a extending in a column direction. Each touch unit 200 may have M signal transmission lines 30a. For the same touch unit 200, one of the M signal transmission lines 30a is electrically connected with one of the touch lines 200a of the touch unit 200, and the remaining (M−1) signal transmission lines 30a are electrically insulated from each of the touch lines 200a of the touch unit 200. For example, for the touch unit 200 in the first row and the first column, one of the M signal transmission lines 30a may be electrically connected with one of the touch lines 200a of the touch unit 200, and the remaining (M−1) signal transmission lines 30a may be electrically insulated from each of the touch lines 200a of the touch unit 200. At least a portion of orthographic projections of the (M−1) signal transmission lines 30a in a plane where the self-capacitance touch panel 1 is located are misaligned with an orthographic projection of any of the touch lines 200a of the touch unit 200 in the plane where the self-capacitance touch panel 1 is located.

The signal transmission line 30a may be electrically connected with the touch line 200a through a conductive plug provided in the insulating layer 21.

One of the M signal transmission lines 30a of touch units 200 in the same column is electrically connected with one of the touch lines 200a of a corresponding one of the M rows of touch units 200 in that column, so as to draw out touch signals from each of the touch units 200 in the same column.

In an embodiment of the present disclosure, for the self-capacitance touch panel 1 with AM pixel units 11, the column direction refers to a direction parallel to the data signal line, and the row direction refers to a direction parallel to the scanning signal line. For the self-capacitance touch panel 1 with PM pixel units 11, the column direction refers to an extending direction of respective first electrodes 11a after being connected, and the row direction refers to an extending direction of respective second electrodes 11b after being connected.

In the embodiment shown in FIG. 3, the signal transmission line 30a located between the pixel units 11 in the Pth column and the pixel units 11 in the (P+1)th column includes a first straight line segment 301 and a first oblique line segment 302. P is an odd number. The first straight line segment 301 extends in the column direction, and the first oblique line segment 302 extends at an angle with respect to the column direction. The angle is greater than 0 and less than 180°. In some embodiments, the signal transmission line 30a may include a plurality of first straight line segments 301 and first oblique line segments 302 symmetrically disposed at both ends of each first straight line segment 301 with respect to the row direction. The touch line 200a located between the pixel units 11 in the P-th column and the pixel units 11 in the (P+1)th column includes a second straight line segment 201 and a second oblique line segment 202. The second straight line segment 201 extends in the column direction, and the second oblique line segment 202 extends at an angle with respect to the column direction. The angle is greater than 0 and less than 180°. In some embodiments, the touch line 200a may include a plurality of second straight line segments 201 and second oblique line segments 202 symmetrically disposed at both ends of each second straight line segment 201 with respect to the row direction.

An orthographic projection of the first straight line segment 301 in the plane where the self-capacitance touch panel 1 is located is misaligned with an orthographic projection of the second straight line segment 201 in the plane where the self-capacitance touch panel 1 is located, and an orthographic projection of the first oblique line segment 302 in the plane where the self-capacitance touch panel 1 is located is misaligned with an orthographic projection of the second oblique line segment 202 in the plane where the self-capacitance touch panel 1 is located. Compared to the structure in which the orthographic projection of the first straight line segment 301 in the plane where the self-capacitance touch panel 1 is located is overlapped with the orthographic projection of the second straight line segment 201 in the plane where the self-capacitance touch panel 1 is located, and the orthographic projection of the first oblique line segment 302 in the plane where the self-capacitance touch panel 1 is located is overlapped with the orthographic projection of the second oblique line segment 202 in the plane where the self-capacitance touch panel 1 is locate, the structure in this embodiment can reduce a parasitic capacitance between the signal transmission line 30a and the touch line 200a, and thus improve the detection accuracy of touch signals.

In some embodiments of the present disclosure, only the orthographic projection of the first straight line segment 301 in the plane where the self-capacitance touch panel 1 is located is misaligned with the orthographic projection of the second straight line segment 201 in the plane where the self-capacitance touch panel 1 is located, while the orthographic projection of the first oblique line segment 302 in the plane where the self-capacitance touch panel 1 is located is overlapped with the orthographic projection of the second oblique line segment 202 in the plane where the self-capacitance touch panel 1 is located. Alternatively, only the orthographic projection of the first oblique line segment 302 in the plane where the self-capacitance touch panel 1 is located is misaligned with the orthographic projection of the second oblique line segment 202 in the plane where the self-capacitance touch panel 1 is located, while the orthographic projection of the first straight line segment 301 in the plane where the self-capacitance touch panel 1 is located is overlapped with the orthographic projection of the second straight line segment 201 in the plane where the self-capacitance touch panel 1 is located.

In some embodiments of the present disclosure, in the case where the touch wiring layer 20 and the signal transmission wiring layer 30 are made of an opaque metal, such as molybdenum, a distance L1 of the first straight line segment 301 from an edge of the nearest pixel unit 11 is equal to a distance L2 of the second straight line segment 201 from an edge of the nearest pixel unit 11, so as to prevent dark lines from being generated due to the presence of the first straight line segment 301 and the second straight line segment 201 when the self-capacitance touch panel 1 is displaying.

In some embodiments of the present disclosure, for any of the touch units 200, at least a portion of orthographic projections of the (M−1) signal transmission lines 30a electrically insulated from each of the touch lines 200a of the touch unit 200 in a plane where the self-capacitance touch panel 1 is located are misaligned with an orthographic projection of any of the touch lines 200a of the touch unit 200 in the plane where the self-capacitance touch panel 1 is located. For instance, referring to FIG. 1, since the first one of the signal transmission lines 30a in the first column is electrically connected with the touch unit 200 in the first row and the first column, the first signal transmission line 30a in the first column is at the same potential as the touch unit 200 in the first row and the first column without any parasitic capacitance therebetween, and there is no need to misalign the signal transmission line 30a with the touch line 200a.

Referring to FIG. 3, in an embodiment of the present disclosure, one signal transmission line 30a is provided for every two columns of pixel units 11, that is, P is an odd number or an even number. The signal transmission lines 30a are evenly distributed. In some embodiments of the present disclosure, one signal transmission line 30a may be provided for every two or more columns of pixel units 11. Alternatively, the signal transmission lines 30a may be unevenly distributed, with some of the signal transmission lines 30a separated by two columns of pixel units 11 and others separated by more than two columns of pixel units 11.

In some embodiments of the present disclosure, redundant signal transmission lines 30a may be provided. For example, for M columns of touch units 200, more than M signal transmission lines 30a may be provided, or two or more signal transmission lines 30a may be electrically connected with one touch unit 200.

Figure 5:
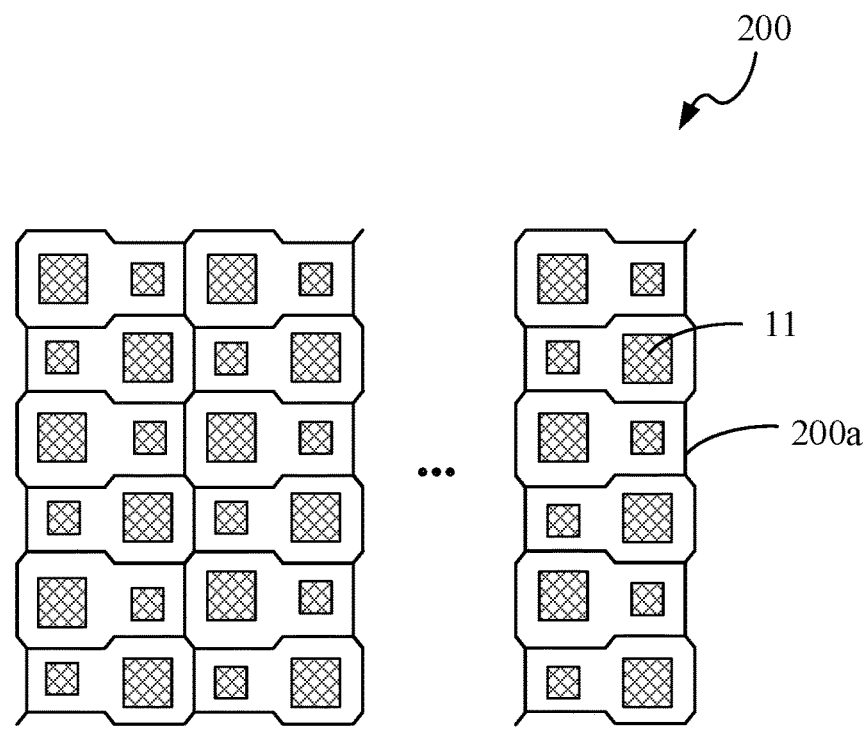
FIG. 5 illustrates an enlarged view of a touch unit in a self-capacitance touch panel according to another embodiment of the present disclosure.
Figure 6:
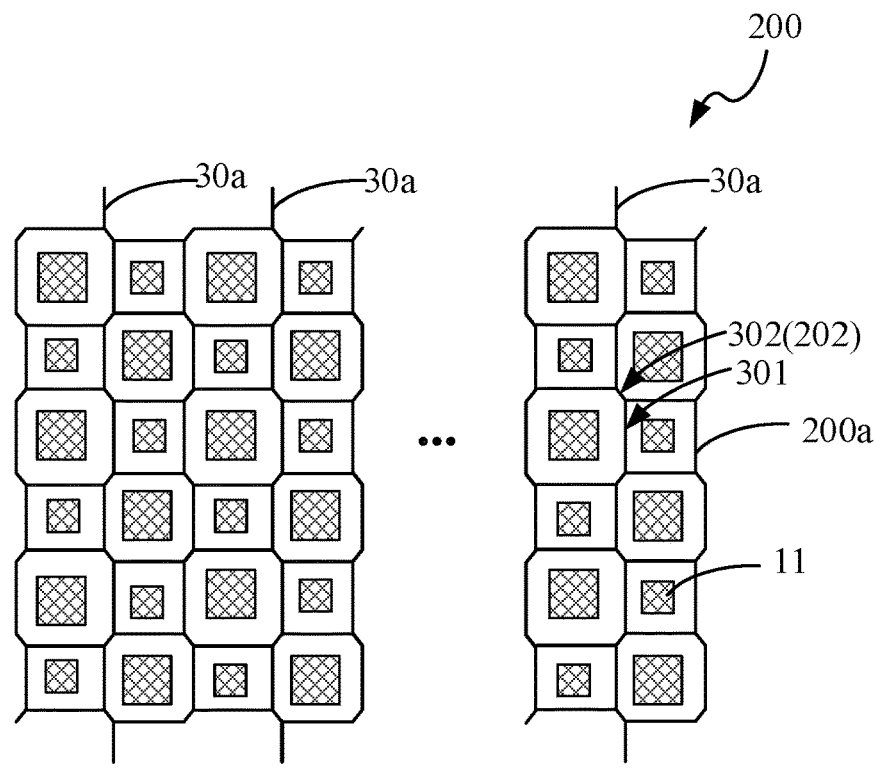
FIG. 6 illustrates a structure with signal transmission lines added to the structure shown in FIG. 5.

FIG. 5 illustrates an enlarged view of a touch unit in a self-capacitance touch panel according to another embodiment of the present disclosure. FIG. 6 illustrates a structure with signal transmission lines added to the structure shown in FIG. 5. Referring to FIGS. 5 and 6, the self-capacitance touch panel in this embodiment has substantially the same structure as the self-capacitance touch panel in FIGS. 1 to 4, except that the touch line 200a located between the pixel units 11 in the Pth column and the pixel units 11 in the (P+1)th column includes only the second oblique line segment 202 which extends at an angle with respect to the column direction; and an orthographic projection of the first oblique line segment 302 in the plane where the self-capacitance touch panel 1 is located is overlapped with an orthographic projection of the second oblique line segment 202 in the plane where the self-capacitance touch panel 1 is located. In other words, the touch line 200a located between the pixel units 11 in the Pth column and the pixel units 11 in the (P+1)th column omits the second straight line segment 201.

Omitting the second straight line segment 201 can prevent an orthographic projection of the first straight line segment 301 in the plane where the self-capacitance touch panel 1 is located from being overlapped with an orthographic projection of the second straight line segment 201 in the plane where the self-capacitance touch panel 1 is located. Compared to the structure in which the orthographic projection of the first straight line segment 301 in the plane where the self-capacitance touch panel 1 is located is overlapped with the orthographic projection of the second straight line segment 201 in the plane where the self-capacitance touch panel 1 is located, a parasitic capacitance between the signal transmission line 30a and the touch line 200a can be reduced and the detection accuracy of touch signals can be improved.

In some embodiments of the present disclosure, in the case where the signal transmission wiring layer 30 is made of an opaque metal such as molybdenum, the first straight line segments 301 are at equal distances from the respective nearest pixel units 11, so as to prevent dark lines from being generated due to the presence of the first straight line segments 301 when the self-capacitance touch panel 1 is displaying.

In some embodiments of the present disclosure, as for the touch unit 200 and the signal transmission line 30a to be electrically connected with each other, the second straight line segment 201 of the touch line 200a between the two columns of pixel units 11 where the signal transmission line 30a is located may not be omitted.

Figure 7:
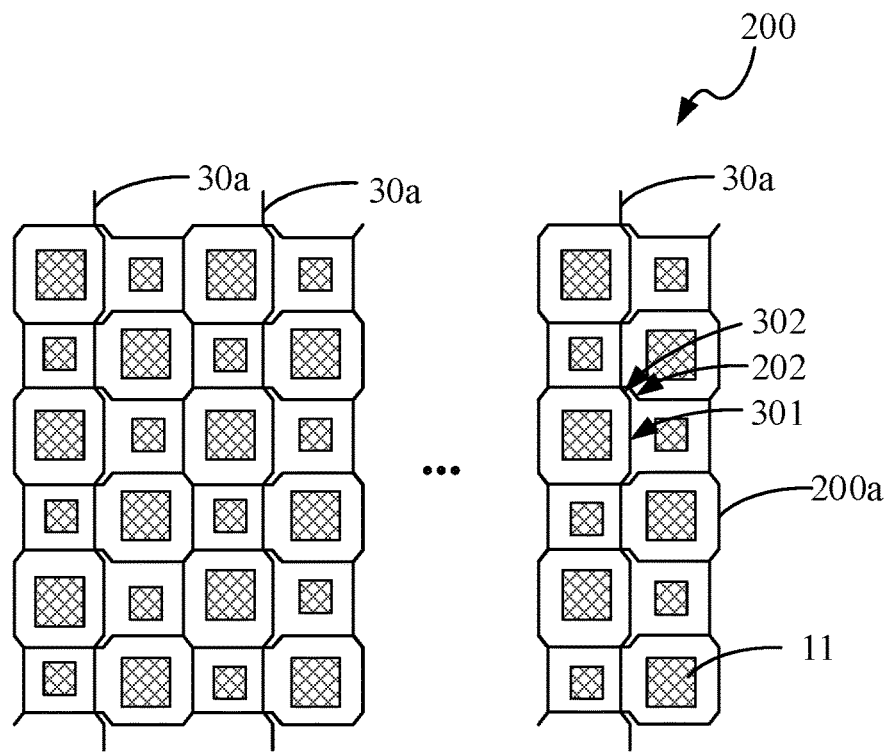
FIG. 7 illustrates an enlarged view of a touch unit in a self-capacitance touch panel according to still another embodiment of the present disclosure, which includes signal transmission lines.

FIG. 7 illustrates an enlarged view of a touch unit in a self-capacitance touch panel according to still another embodiment of the present disclosure, which includes signal transmission lines. Referring to FIGS. 5 and 7, the self-capacitance touch panel in this embodiment has substantially the same structure as the self-capacitance touch panel in FIG. 6, except that an orthographic projection of the first oblique line segment 302 in the plane where the self-capacitance touch panel 1 is located is misaligned with an orthographic projection of the second oblique line segment 202 in the plane where the self-capacitance touch panel 1 is located.

Compared to the structure in FIG. 6, the structure in this embodiment can further reduce a parasitic capacitance between the signal transmission line 30a and the touch line 200a, and thus improve the detection accuracy of touch signals.

Figure 8:
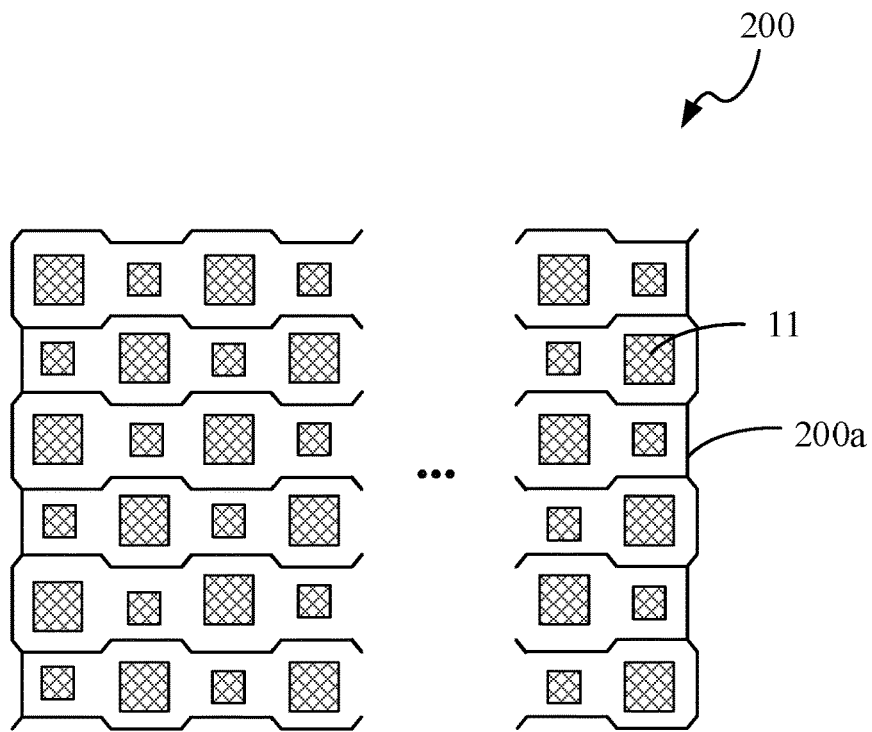
FIG. 8 illustrates an enlarged view of a touch unit in a self-capacitance touch panel according to yet another embodiment of the present disclosure.
Figure 9:
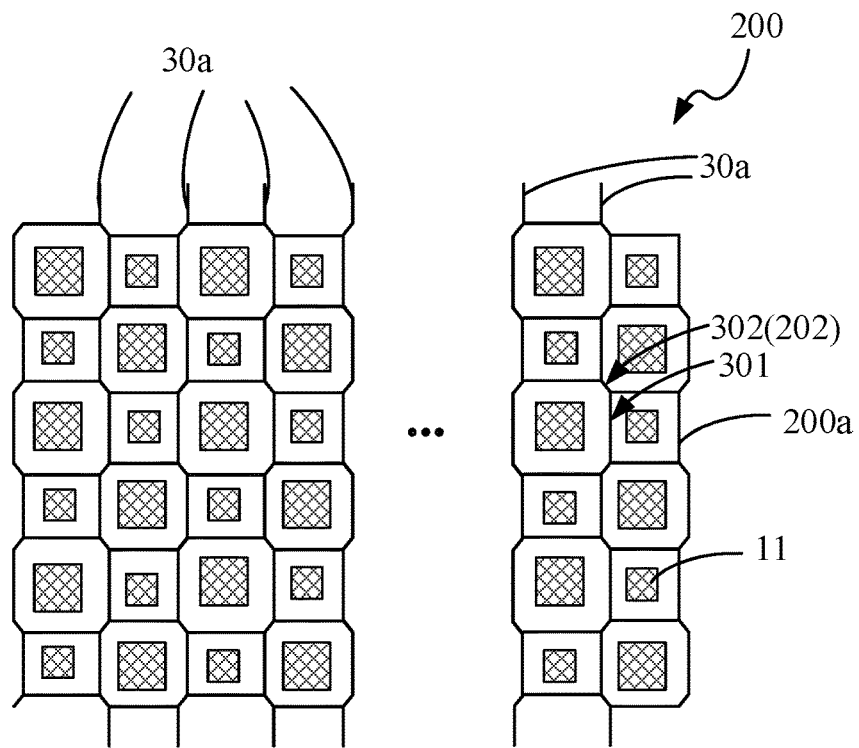
FIG. 9 illustrates a structure with signal transmission lines added to the structure shown in FIG. 8.

FIG. 8 illustrates an enlarged view of a touch unit in a self-capacitance touch panel according to yet another embodiment of the present disclosure. FIG. 9 illustrates a structure with signal transmission lines added to the structure shown in FIG. 8. Referring to FIGS. 8 and 9, the self-capacitance touch panel in this embodiment has substantially the same structure as the self-capacitance touch panel in FIGS. 5 and 6, except that no touch lines 200a parallel to the column direction are provided inside the touch unit 200, on the premise that respective touch lines 200a of the touch unit 200 are electrically connected together. In other words, the touch line 200a between adjacent columns of pixel units 11 omits the second straight line segment 201.

Each column of pixel units 11 is distributed with one signal transmission line 30a. For the same number of pixel units 11 in the touch unit 200, the number of the signal transmission lines 30a in the touch units 200 in the embodiment shown in FIGS. 8 and 9 is larger than that in the embodiment shown in FIGS. 5 and 6. In the same column of touch units 200, one signal transmission line 30a is electrically connected with a corresponding one of the touch units 200, such that the signal transmission lines 30a may be electrically connected with corresponding touch units 200 in different rows. Thus, the larger the number of the signal transmission lines 30a located in the same column of touch units 200, touch signals can be drawn from more rows of touch units 200, thereby improving the detection accuracy of the touch signals.

Figure 10:
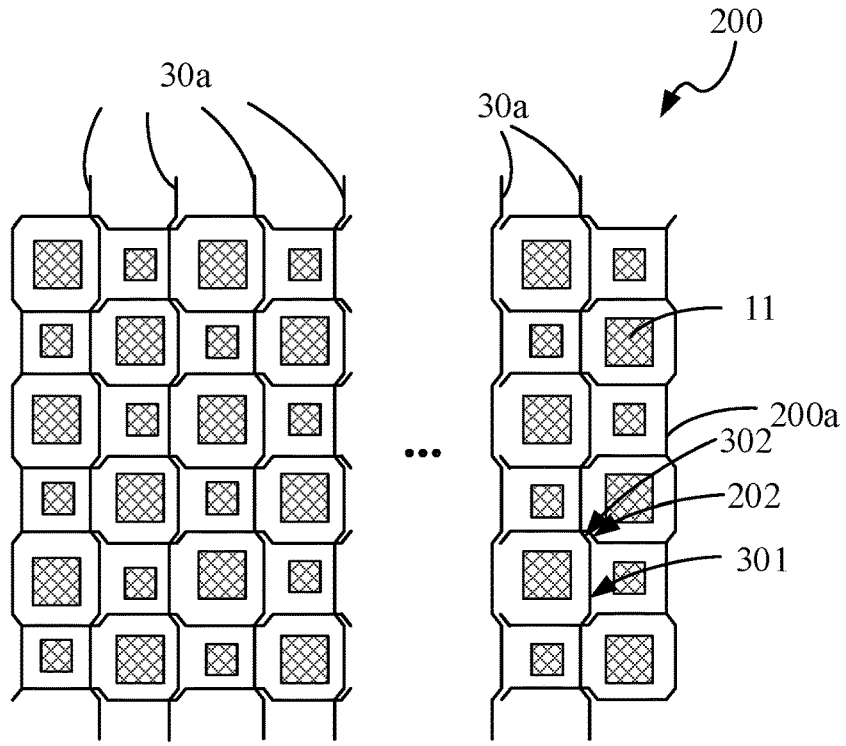
FIG. 10 illustrates an enlarged view of a touch unit in a self-capacitance touch panel according to still another embodiment of the present disclosure, which includes signal transmission lines.

FIG. 10 illustrates an enlarged view of a touch unit in a self-capacitance touch panel according to still another embodiment of the present disclosure, which includes signal transmission lines. Referring to FIGS. 8 and 10, the self-capacitance touch panel in this embodiment has substantially the same structure as the self-capacitance touch panel in FIG. 9, except that an orthographic projection of the first oblique line segment 302 in the plane where the self-capacitance touch panel 1 is located is misaligned with an orthographic projection of the second oblique line segment 202 in the plane where the self-capacitance touch panel 1 is located.

Compared to the structure shown in FIG. 9, the structure shown in FIG. 10 can further reduce a parasitic capacitance between the signal transmission line 30a and the touch line 200a, and thus improve the detection accuracy of touch signals.

Figure 11:
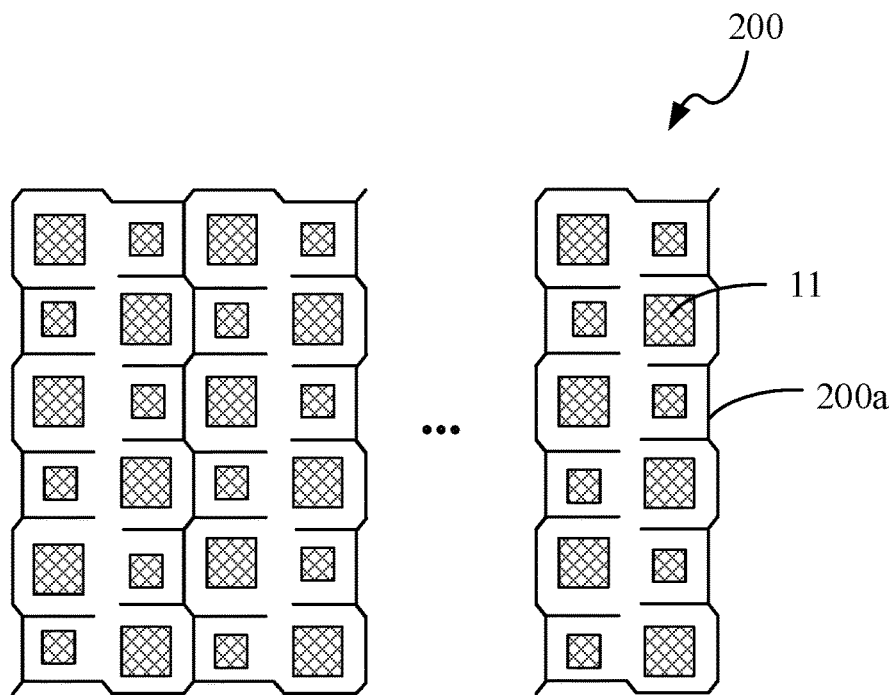
FIG. 11 illustrates an enlarged view of a touch unit in a self-capacitance touch panel according to yet another embodiment of the present disclosure.
Figure 12:
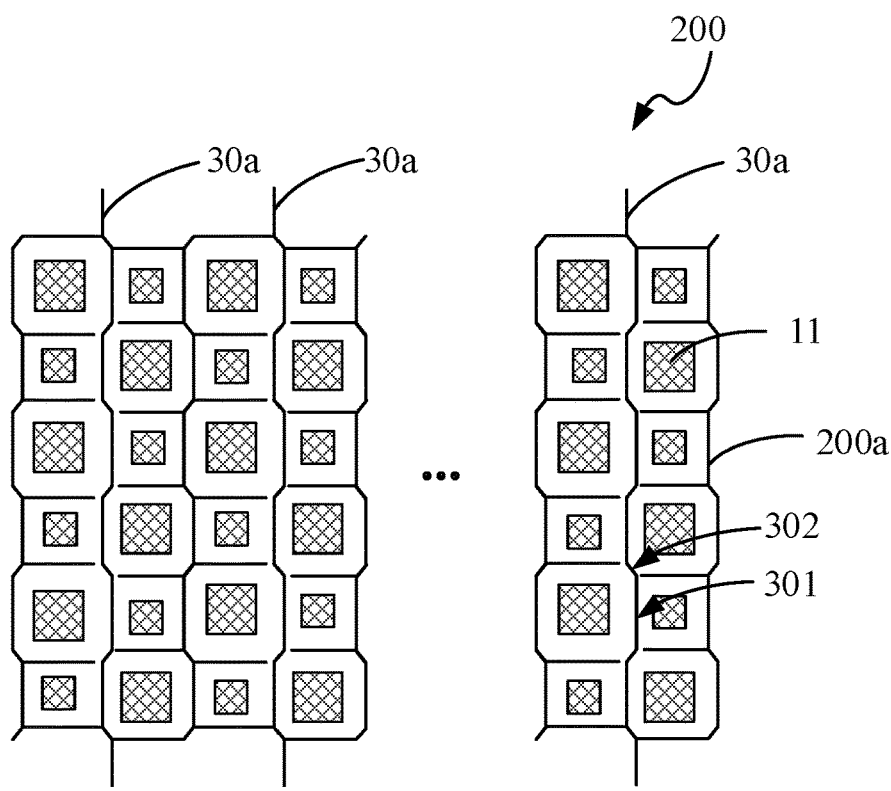
FIG. 12 illustrates a structure with signal transmission lines added to the structure shown in FIG. 11.

FIG. 11 illustrates an enlarged view of a touch unit in a self-capacitance touch panel according to yet another embodiment of the present disclosure. FIG. 12 illustrates a structure with signal transmission lines added to the structure shown in FIG. 11. Referring to FIGS. 11 and 12, the self-capacitance touch panel in this embodiment has substantially the same structure as the self-capacitance touch panel in FIGS. 1 to 4, except that no touch line 200a is provided between the pixel units 11 in the Pth column and the pixel units 11 in the (P+1)th column, on the premise that respective touch lines 200a of the touch unit 200 are electrically connected together, where P is an odd number.

In some embodiments of the present disclosure, P may be an even number.

Providing no touch line 200a can prevent an orthographic projection of the signal transmission line 30a in the plane where the self-capacitance touch panel 1 is located from being overlapped with an orthographic projection of the touch line 200a in the plane where the self-capacitance touch panel 1 is located. Compared to the structure in which an orthographic projection of the signal transmission line 30a in the plane where the self-capacitance touch panel 1 is located is overlapped with an orthographic projection of the touch line 200a in the plane where the self-capacitance touch panel 1 is located, a parasitic capacitance between the signal transmission line 30a and the touch line 200a can be reduced, and the detection accuracy of touch signals can be improved.

Figure 13:
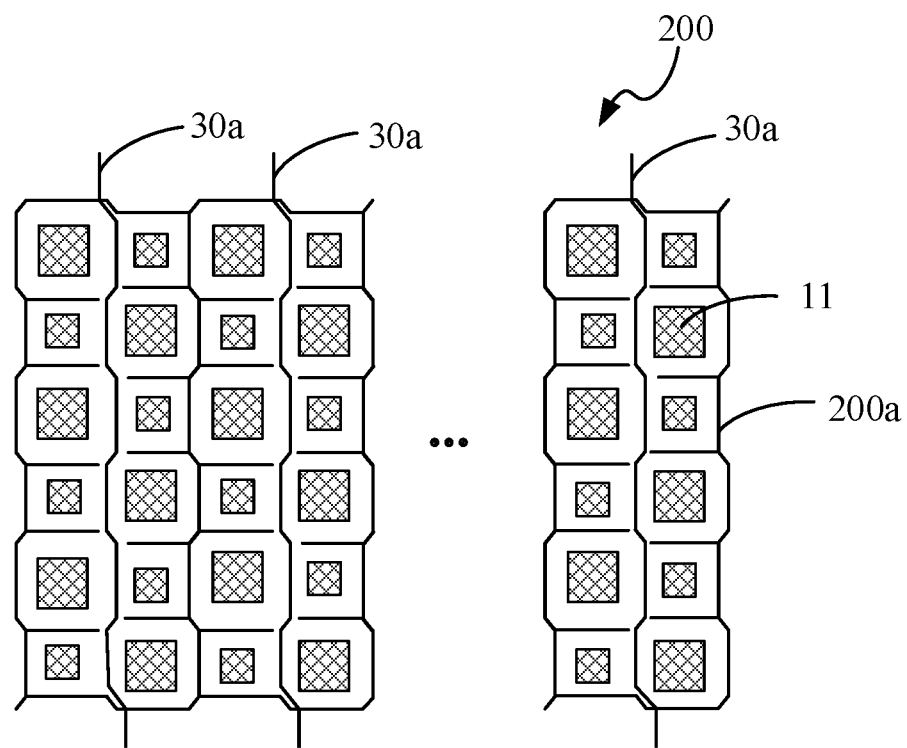
FIG. 13 illustrates an enlarged view of a touch unit in a self-capacitance touch panel according to still another embodiment of the present disclosure, which includes signal transmission lines.

FIG. 13 illustrates an enlarged view of a touch unit in a self-capacitance touch panel according to still another embodiment of the present disclosure, which includes signal transmission lines. Referring to FIGS. 11 and 13, the self-capacitance touch panel in this embodiment has substantially the same structure as the self-capacitance touch panel in FIG. 12, except that an orthographic projection of the first oblique line segment 302 in the plane where the self-capacitance touch panel 1 is located is misaligned with an orthographic projection of the second oblique line segment 202 of the touch line 200a in the plane where the self-capacitance touch panel 1 is located. The second oblique line segment 202 in this embodiment includes oblique line segments that electrically connect adjacent touch lines 200a in one touch unit 200.

Compared to the structure in FIG. 12, the structure in the present embodiment can further reduce a parasitic capacitance between the signal transmission line 30a and the touch line 200a, and thus improve the detection accuracy of touch signals.

Figure 14:
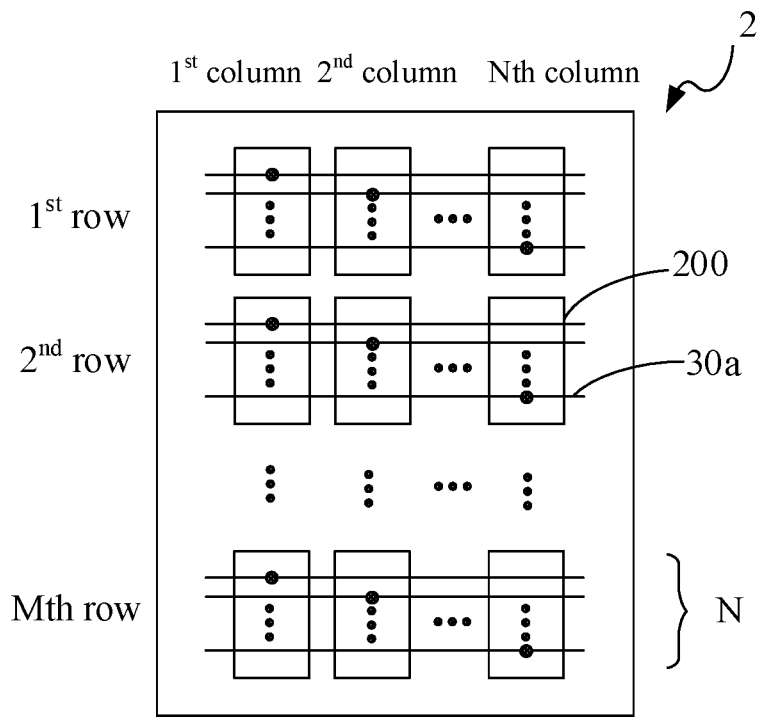
FIG. 14 illustrates a schematic top view of a structure of a self-capacitance touch panel according to another embodiment of the present disclosure.
Figure 15:
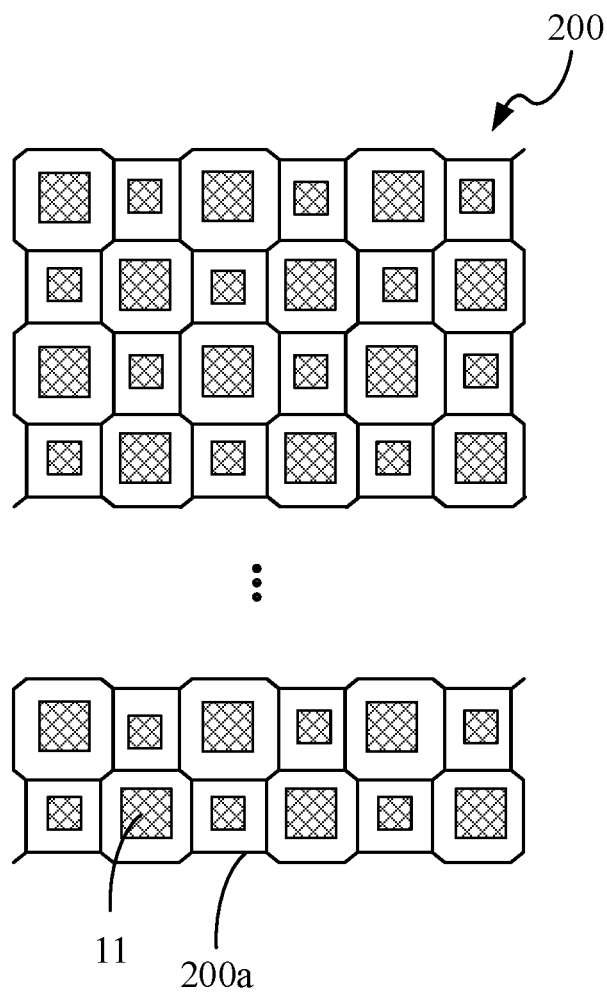
FIG. 15 illustrates an enlarged view of a touch unit in FIG. 14.
Figure 16:
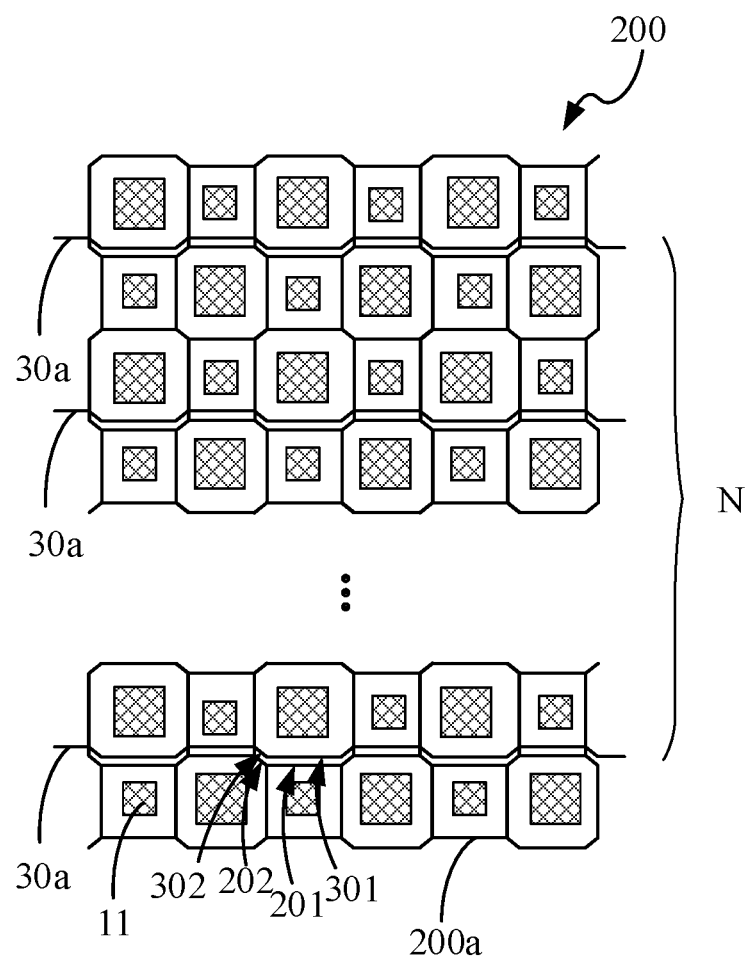
FIG. 16 illustrates a structure with signal transmission lines added to the structure shown in FIG. 15.

FIG. 14 illustrates a schematic top view of a structure of a self-capacitance touch panel according to another embodiment of the present disclosure. FIG. 15 illustrates an enlarged view of a touch unit in FIG. 14. FIG. 16 illustrates a structure with signal transmission lines added to the structure shown in FIG. 15.

Referring to FIGS. 14 to 16 and FIG. 4, the self-capacitance touch panel 2 in this embodiment has substantially the same structure as the self-capacitance touch panel 1 in FIGS. 1 to 4, except that the signal transmission wiring layer 30 includes M*N signal transmission lines 30a extending in a row direction. Each touch unit 200 may have N signal transmission lines 30a. For the same touch unit 200, one of the N signal transmission lines 30a is electrically connected with one of the touch lines 200a of the touch unit 200, and the remaining (N−1) signal transmission lines 30a are electrically insulated from each of the touch lines 200a of the touch unit 200. For example, for the touch unit 200 in the first row and the first column, one of the N signal transmission lines 30a may be electrically connected with one of the touch lines 200a of the touch unit 200, and the remaining (N−1) signal transmission lines 30a may be electrically insulated from each of the touch lines 200a of the touch unit 200. At least a portion of orthographic projections of the (N−1) signal transmission lines 30a in a plane where the self-capacitance touch panel 2 is located are misaligned with an orthographic projection of each of the touch lines 200a of the touch unit 200 in the plane where the self-capacitance touch panel 2 is located.

One of the N signal transmission lines 30a of touch units 200 in the same row is electrically connected with one of the touch lines 200a of a corresponding one of the N columns of touch units 200 in that row, so as to draw out touch signals from each of the touch units 200 in the same row.

In this embodiment, for the self-capacitance touch panel 2 with AM pixel units 11, the row direction refers to a direction parallel to the scanning signal line, and the column direction refers to a direction parallel to the data signal line. For the self-capacitance touch panel 2 with PM pixel units 11, the row direction refers to an extending direction of respective second electrodes 11b after being connected, and the column direction refers to an extending direction of respective first electrodes 11a after being connected.

In the embodiment shown in FIG. 16, the signal transmission line 30a located between the pixel units 11 in the Qth row and the pixel units 11 in the (Q+1)th row includes a first straight line segment 301 and a first oblique line segment 302. Q is an odd number. The first straight line segment 301 extends in the row direction, and the first oblique line segment 302 extends at an angle with respect to the row direction. The angle is greater than 0 and less than 180°. In some embodiments, the signal transmission line 30a may include a plurality of first straight line segments 301 and first oblique line segments 302 symmetrically disposed at both ends of each first straight line segment 301 with respect to the column direction. The touch line 200a located between the pixel units 11 in the Qth row and the pixel units 11 in the (Q+1)th row includes a second straight line segment 201 and a second oblique line segment 202. The second straight line segment 201 extends in the row direction, and the second oblique line segment 202 extends at an angle with respect to the row direction. The angle is greater than 0 and less than 180°. In some embodiments, the touch line 200a may include a plurality of second straight line segments 201 and second oblique line segments 202 symmetrically disposed at both ends of each second straight line segment 201 with respect to the column direction.

An orthographic projection of the first straight line segment 301 in the plane where the self-capacitance touch panel 2 is located is misaligned with an orthographic projection of the second straight line segment 201 in the plane where the self-capacitance touch panel 2 is located, and an orthographic projection of the first oblique line segment 302 in the plane where the self-capacitance touch panel 2 is located is misaligned with an orthographic projection of the second oblique line segment 202 in the plane where the self-capacitance touch panel 2 is located. Compared to the structure in which orthographic projection of the first straight line segment 301 in the plane where the self-capacitance touch panel 2 is located is overlapped with the orthographic projection of the second straight line segment 201 in the plane where the self-capacitance touch panel 2 is located, and the orthographic projection of the first oblique line segment 302 in the plane where the self-capacitance touch panel 2 is located is overlapped with the orthographic projection of the second oblique line segment 202 in the plane where the self-capacitance touch panel 2 is locate, the structure in this embodiment can reduce a parasitic capacitance between the signal transmission line 30a and the touch line 200a, and thus improve the detection accuracy of touch signals.

In some embodiments of the present disclosure, only the orthographic projection of the first straight line segment 301 in the plane where the self-capacitance touch panel 2 is located is misaligned with the orthographic projection of the second straight line segment 201 in the plane where the self-capacitance touch panel 2 is located, while the orthographic projection of the first oblique line segment 302 in the plane where the self-capacitance touch panel 2 is located is overlapped with the orthographic projection of the second oblique line segment 202 in the plane where the self-capacitance touch panel 2 is located. Alternatively, only the orthographic projection of the first oblique line segment 302 in the plane where the self-capacitance touch panel 2 is located is misaligned with the orthographic projection of the second oblique line segment 202 in the plane where the self-capacitance touch panel 2 is located, while the orthographic projection of the first straight line segment 301 in the plane where the self-capacitance touch panel 2 is located is overlapped with the orthographic projection of the second straight line segment 201 in the plane where the self-capacitance touch panel 2 is located.

In some embodiments of the present disclosure, for any of the touch units 200, at least a portion of orthographic projections of the (N−1) signal transmission lines 30a electrically insulated from each of the touch lines 200a of the touch unit 200 in a plane where the self-capacitance touch panel 2 is located are misaligned with an orthographic projection of each of the touch lines 200a of the touch unit 200 in the plane where the self-capacitance touch panel 1 is located. For instance, referring to FIG. 14, since the first one of the signal transmission lines 30a in the first row is electrically connected with the touch unit 200 in the first row and the first column, the first signal transmission line 30a in the first row is at the same potential as the touch unit 200 in the first row and the first column without any parasitic capacitance therebetween, and there is no need to misalign the signal transmission line 30a with the touch line 200a.

Referring to FIG. 16, in the present embodiment, one signal transmission line 30a is provided for every two rows of pixel units 11, that is, Q is an odd number or an even number. The signal transmission lines 30a are evenly distributed. In other embodiments, one signal transmission line 30a may be provided for every two or more rows of pixel units 11. Alternatively, the signal transmission lines 30a may be unevenly distributed, with some of the signal transmission lines 30a separated by two rows of pixel units 11 and others separated by more than two rows of pixel units 11.

Figure 17:
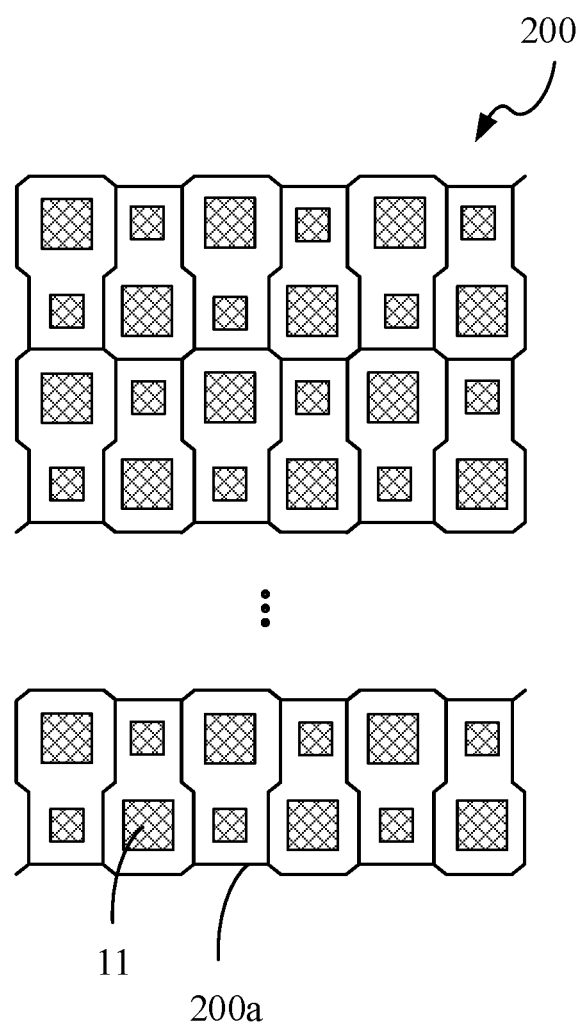
FIG. 17 illustrates an enlarged view of a touch unit in a self-capacitance touch panel according to still another embodiment of the present disclosure.
Figure 18:
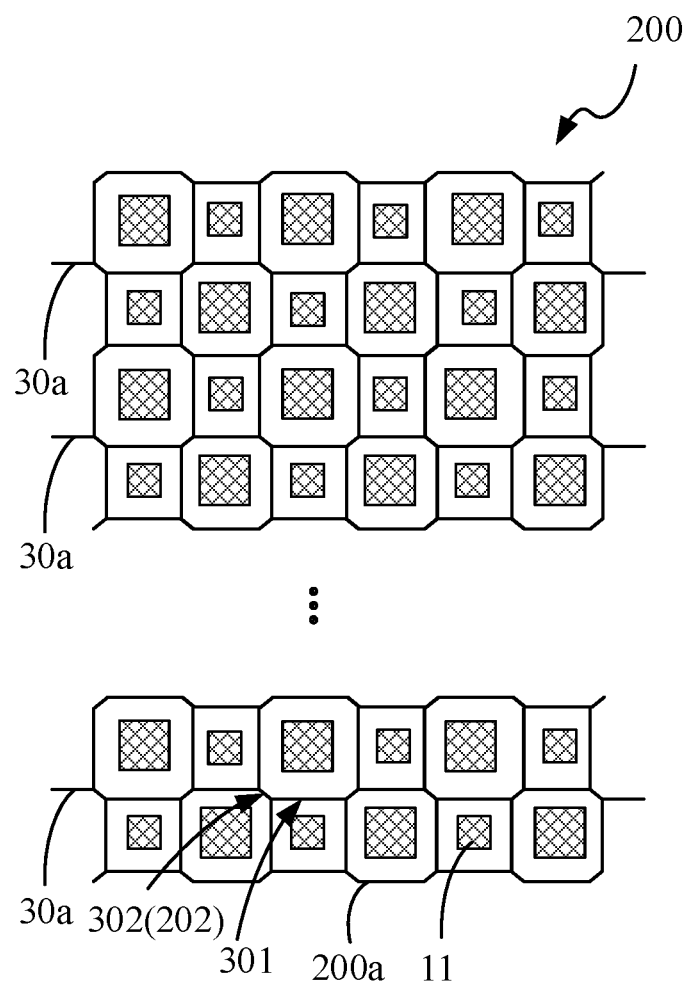
FIG. 18 illustrates a structure with signal transmission lines added to the structure shown in FIG. 17.

FIG. 17 illustrates an enlarged view of a touch unit in a self-capacitance touch panel according to still another embodiment of the present disclosure. FIG. 18 illustrates a structure with signal transmission lines added to the structure shown in FIG. 17. Referring to FIGS. 17 and 18, the self-capacitance touch panel in this embodiment has substantially the same structure as the self-capacitance touch panel in FIGS. 14 to 16, except that the touch line 200a located between the pixel units 11 in the Qth row and the pixel units 11 in the (Q+1)th row includes only the second oblique line segment 202 which extends at an angle with respect to the row direction; and an orthographic projection of the first oblique line segment 302 in the plane where the self-capacitance touch panel 2 is located is overlapped with an orthographic projection of the second oblique line segment 202 in the plane where the self-capacitance touch panel 2 is located. In other words, the touch line 200a located between the pixel units 11 in the Qth row and the pixel units 11 in the (Q+1)th row is provided with no second straight line segment 201.

Providing no second straight line segment 201 can prevent an orthographic projection of the first straight line segment 301 in the plane where the self-capacitance touch panel 2 is located from being overlapped with an orthographic projection of the second straight line segment 201 in the plane where the self-capacitance touch panel 2 is located. Compared to the structure in which the orthographic projection of the first straight line segment 301 in the plane where the self-capacitance touch panel 2 is located is overlapped with the orthographic projection of the second straight line segment 201 in the plane where the self-capacitance touch panel 2 is located, a parasitic capacitance between the signal transmission line 30a and the touch line 200a can be reduced and the detection accuracy of touch signals can be improved.

In some embodiments of the present disclosure, as for the touch unit 200 and the signal transmission line 30a to be electrically connected with each other, the touch line 200a between the two rows of pixel units 11 where the signal transmission line 30a is located may be provided with the second straight line segment 201.

Figure 19:
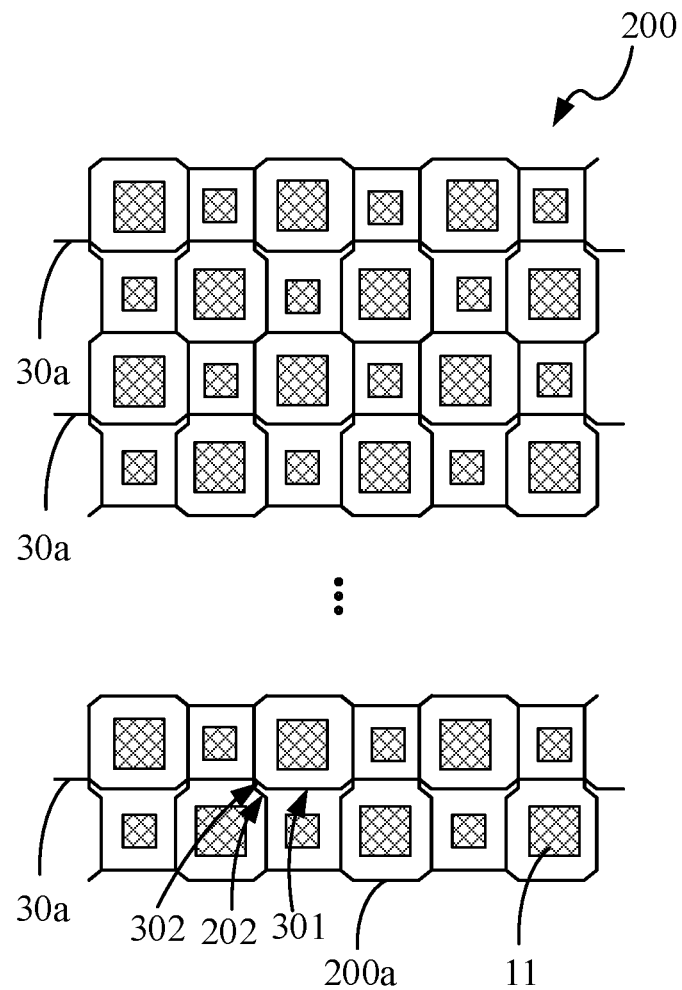
FIG. 19 illustrates an enlarged view of a touch unit in a self-capacitance touch panel according to yet another embodiment of the present disclosure, which includes signal transmission lines.

FIG. 19 illustrates an enlarged view of a touch unit in a self-capacitance touch panel according to yet another embodiment of the present disclosure, which includes signal transmission lines. Referring to FIGS. 17 and 19, the self-capacitance touch panel in this embodiment has substantially the same structure as the self-capacitance touch panel in FIG. 18, except that an orthographic projection of the first oblique line segment 302 in the plane where the self-capacitance touch panel 2 is located is misaligned with an orthographic projection of the second oblique line segment 202 in the plane where the self-capacitance touch panel 2 is located.

Compared to the structure in FIG. 18, the structure in this embodiment can further reduce a parasitic capacitance between the signal transmission line 30a and the touch line 200a, and thus improve the detection accuracy of touch signals.

Figure 20:
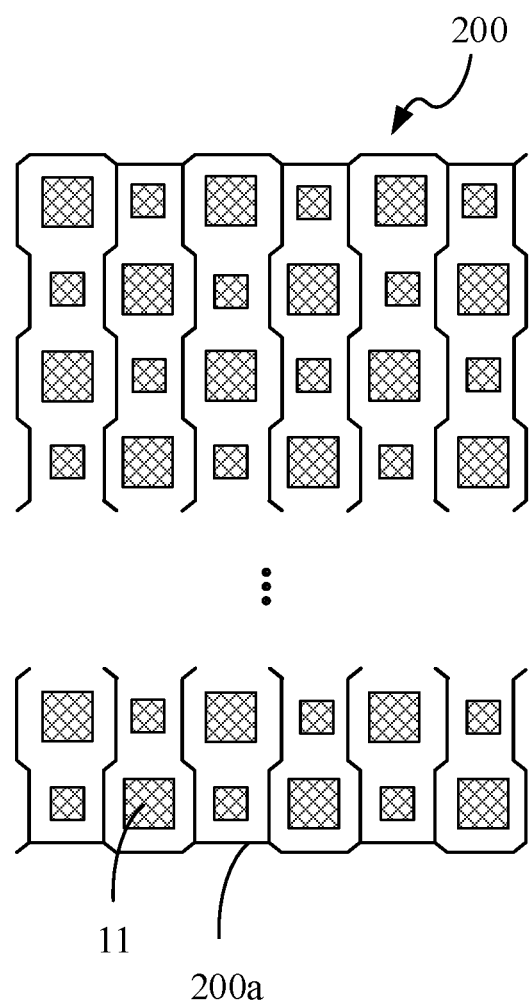
FIG. 20 illustrates an enlarged view of a touch unit in a self-capacitance touch panel according to still another embodiment of the present disclosure.
Figure 21:
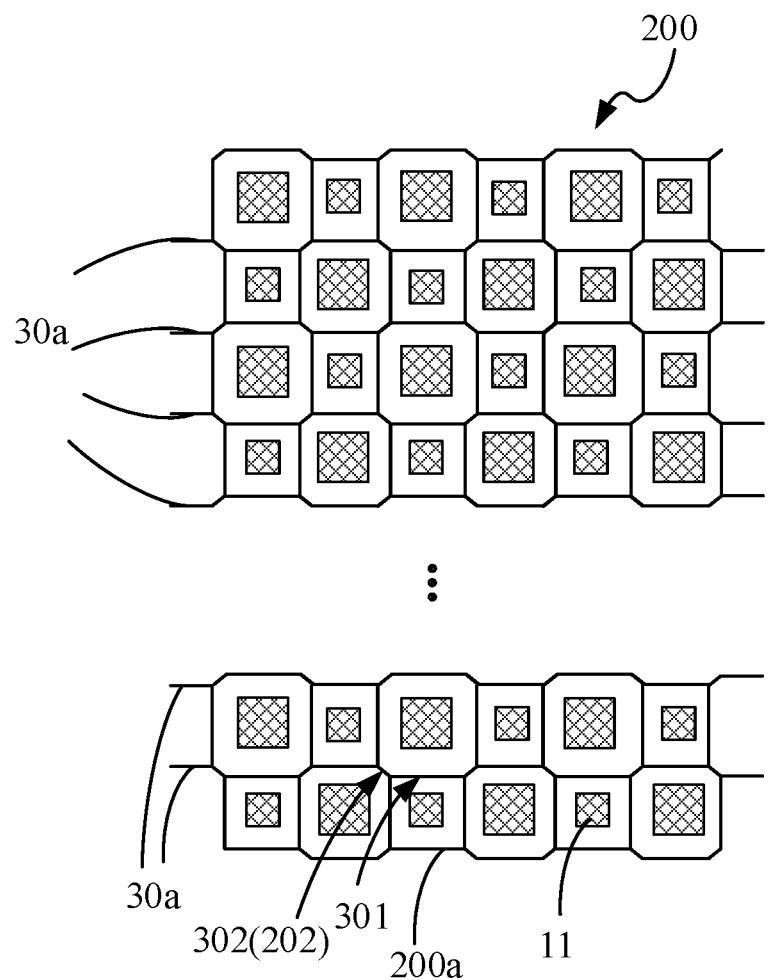
FIG. 21 illustrates a structure with signal transmission lines added to the structure shown in FIG. 20.

FIG. 20 illustrates an enlarged view of a touch unit in a self-capacitance touch panel according to still another embodiment of the present disclosure. FIG. 21 illustrates a structure with signal transmission lines added to the structure shown in FIG. 20. The self-capacitance touch panel as shown in FIGS. 20 and 21 has substantially the same structure as the self-capacitance touch panel in FIGS. 17 and 18, except that no touch lines 200a parallel to the row direction are provided inside the touch unit 200, on the premise that respective touch lines 200a of the touch unit 200 are electrically connected together. In other words, the touch line 200a between adjacent rows of pixel units 11 is provided with no second straight line segment 201.

Each row of pixel units 11 is distributed with one signal transmission line 30a. For the same number of pixel units 11 in the touch unit 200, the number of the signal transmission lines 30a in the touch units 200 in this embodiment is larger than that in the embodiment shown in FIG. 17. In the same row of touch units 200, one signal transmission line 30a is electrically connected with a corresponding one of the touch units 200, such that the signal transmission lines 30a may be electrically connected with corresponding touch units 200 in different columns. Thus, the larger the number of the signal transmission lines 30a located in the same row of touch units 200, touch signals can be drawn from more columns of touch units 200, thereby improving the detection accuracy of the touch signals.

Figure 22:
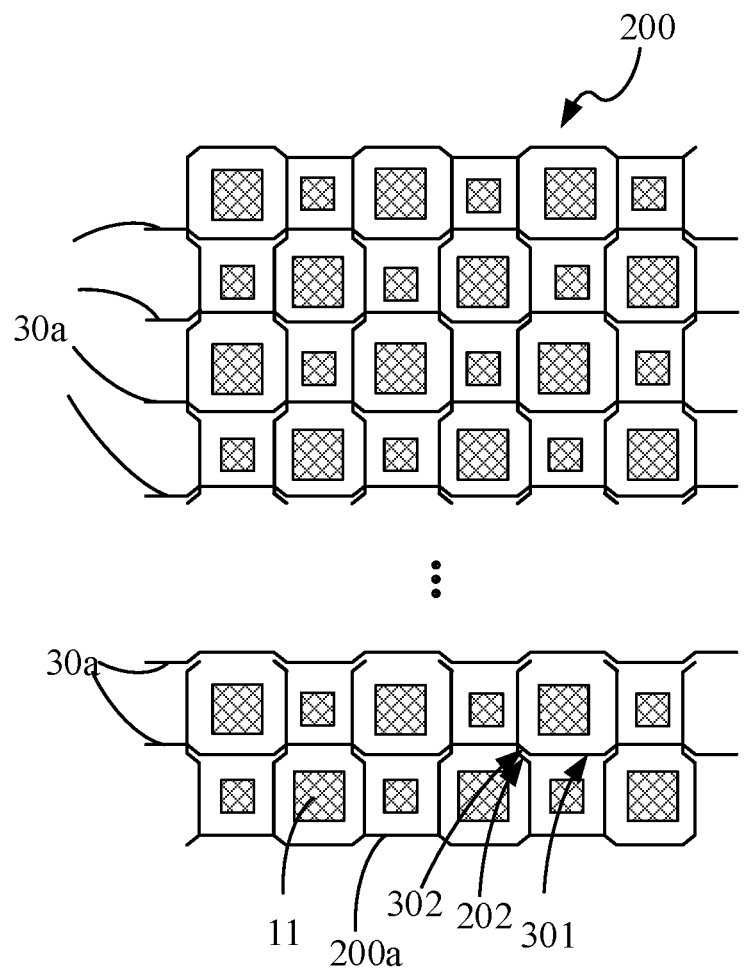
FIG. 22 illustrates an enlarged view of a touch unit in a self-capacitance touch panel according to yet another embodiment of the present disclosure, which includes signal transmission lines.

FIG. 22 illustrates an enlarged view of a touch unit in a self-capacitance touch panel according to yet another embodiment of the present disclosure, which includes signal transmission lines. The self-capacitance touch panel in FIG. 22 has substantially the same structure as the self-capacitance touch panel in FIG. 21, except that an orthographic projection of the first oblique line segment 302 in the plane where the self-capacitance touch panel 2 is located is misaligned with an orthographic projection of the second oblique line segment 202 in the plane where the self-capacitance touch panel 2 is located.

Compared to the structure shown in FIG. 21, the structure shown in FIG. 22 can further reduce a parasitic capacitance between the signal transmission line 30a and the touch line 200a, and thus improve the detection accuracy of touch signals.

Figure 23:
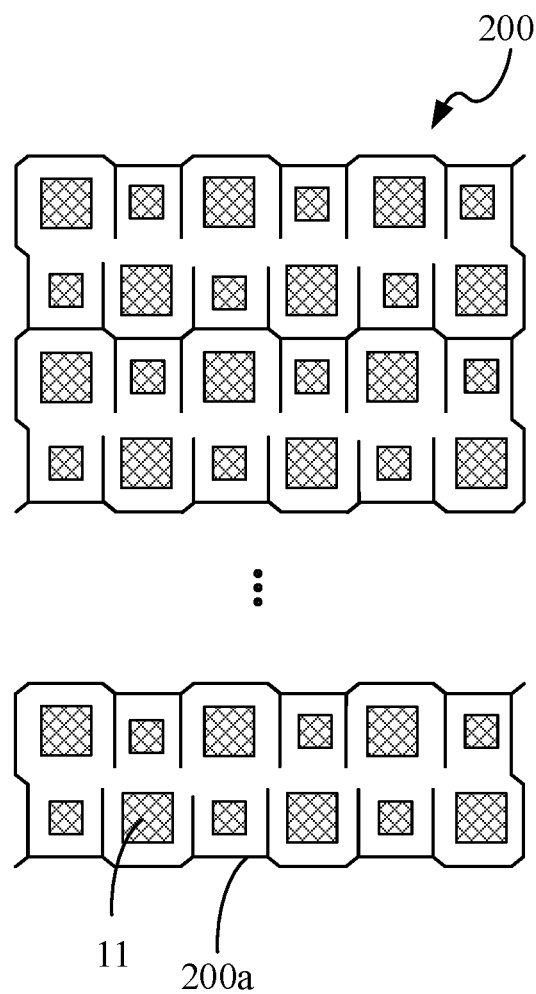
FIG. 23 illustrates an enlarged view of a touch unit in a self-capacitance touch panel according to still another embodiment of the present disclosure.
Figure 24:
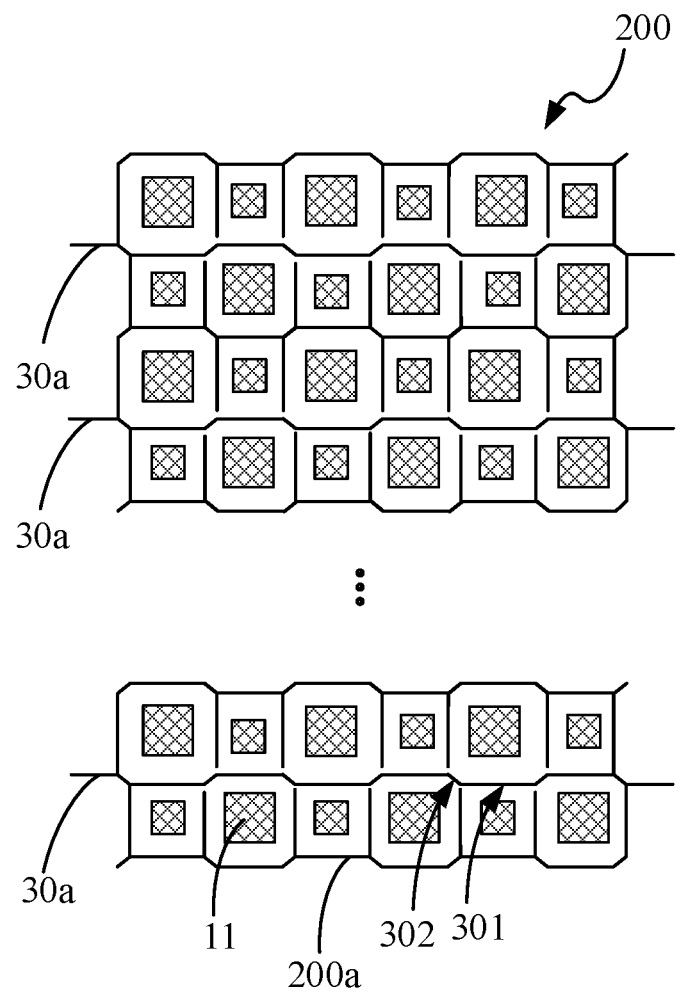
FIG. 24 illustrates a structure with signal transmission lines added to the structure shown in FIG. 23.

FIG. 23 illustrates an enlarged view of a touch unit in a self-capacitance touch panel according to still another embodiment of the present disclosure. FIG. 24 illustrates a structure with signal transmission lines added to the structure shown in FIG. 23. The self-capacitance touch panel shown in FIGS. 23 and 24 has substantially the same structure as the self-capacitance touch panel in FIGS. 14 to 16, except that no touch line 200a is provided between the pixel units 11 in the Qth row and the pixel units 11 in the (Q+1)th row, on the premise that respective touch lines 200a of the touch unit 200 are electrically connected together, where Q is an odd number. In some embodiments of the present disclosure, Q may be an even number.

Providing no touch line 200a can prevent an orthographic projection of the signal transmission line 30a in the plane where the self-capacitance touch panel 2 is located from being overlapped with an orthographic projection of the touch line 200a in the plane where the self-capacitance touch panel 2 is located. Compared to the structure in which an orthographic projection of the signal transmission line 30a in the plane where the self-capacitance touch panel 2 is located is overlapped with an orthographic projection of the touch line 200a in the plane where the self-capacitance touch panel 2 is located, a parasitic capacitance between the signal transmission line 30a and the touch line 200a can be reduced, and the detection accuracy of touch signals can be improved.

Figure 25:
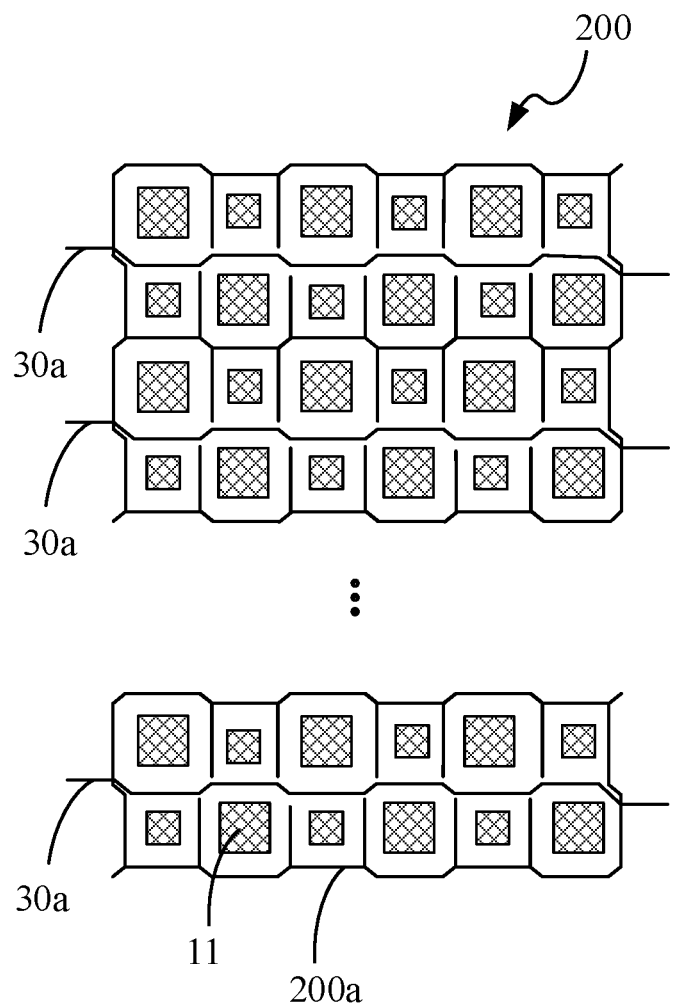
FIG. 25 illustrates an enlarged view of a touch unit in a self-capacitance touch panel according to yet another embodiment of the present disclosure, which includes signal transmission lines.

FIG. 25 illustrates an enlarged view of a touch unit in a self-capacitance touch panel according to yet another embodiment of the present disclosure, which includes signal transmission lines. The self-capacitance touch panel shown in FIG. 25 has substantially the same structure as the self-capacitance touch panel in FIG. 24, except that an orthographic projection of the first oblique line segment 302 in the plane where the self-capacitance touch panel 2 is located is misaligned with an orthographic projection of the second oblique line segment 202 of the touch line 200a in the plane where the self-capacitance touch panel 2 is located. The second oblique line segment 202 in this embodiment includes oblique line segments that electrically connect adjacent touch lines 200a in one touch unit 200.

Compared to the structure in FIG. 24, the structure in the present embodiment can further reduce a parasitic capacitance between the signal transmission line 30*a* and the touch line 200*a*, and thus improve the detection accuracy of touch signals.

At least one embodiment of the present disclosure also provides a display apparatus including the self-capacitance touch panel according to any of the above embodiments. The display apparatus may include any product or component with touch and display functions, such as electronic paper, mobile phone, tablet computer, television, notebook computer, digital photo frame, and navigator.

It should be pointed out that in the drawings, sizes of layers and regions may be exaggerated for clarity of illustration. It should be understood that when an element or layer is referred to as being "on" another element or layer, it can be directly on the other element or layer, or an intervening element or layer may be present. In addition, it should be understood that when an element or layer is referred to as being "under" another element or layer, it can be directly under the other element or layer, or there may be more than one intervening layer or element. It should also be understood that when a layer or element is referred to as being "between" two layers or two elements, it can be the only layer between the two layers or the two elements, or there may be more than one intervening layer or element. Similar reference numerals indicate similar elements throughout. In the present disclosure, terms "first" and "second" are only used for descriptive purposes, and cannot be understood as indicating or implying relative importance.

Those skilled in the art will easily conceive of other embodiments of the present disclosure after considering the specification and practicing the disclosure disclosed herein. The present disclosure is intended to cover any variations, uses or adaptive changes of the present disclosure. These variations, uses or adaptive changes follow the general principles of the present disclosure and include common knowledge or conventional technical means in the art that are not disclosed by the present disclosure. The specification and the embodiments are to be regarded as exemplary only, and the true scope and spirit of the present disclosure are pointed out by the following claims.

It should be understood that the present disclosure is not limited to the precise structures that have been described above and shown in the drawings, and various modifications and changes may be made without departing from the scope thereof. The scope of the present disclosure is only limited by the appended claims.

The invention claimed is:

1. A self-capacitance touch panel, comprising:
a touch wiring layer;
a signal transmission wiring layer; and
a plurality of pixel units arranged in an array, wherein
the touch wiring layer comprises a plurality of touch units arranged in an array, and each of the touch units comprises a plurality of touch lines electrically connected together;
the signal transmission wiring layer comprises a plurality of signal transmission lines extending in a row direction or a column direction, and at least one of the signal transmission lines is electrically connected with a corresponding one of the touch units and electrically insulated from the rest of the touch units in an extending direction thereof;
at least a portion of an orthographic projection of the signal transmission line in a plane where the self-capacitance touch panel is located is misaligned with an orthographic projection of each of the touch lines of the touch units electrically insulated from the signal transmission line in the plane where the self-capacitance touch panel is located;
an orthographic projection of each of the touch lines in the plane where the self-capacitance touch panel is located is located between orthographic projections of corresponding adjacent pixel units in the plane where the self-capacitance touch panel is located;
an orthographic projection of each of the signal transmission lines in the plane where the self-capacitance touch panel is located is located between orthographic projections of corresponding adjacent pixel units in the plane where the self-capacitance touch panel is located;
the touch unit comprises the touch lines between multiple of the plurality of pixel units;
the signal transmission lines extend in the column direction, the signal transmission line located between the pixel units in a Pth column and the pixel units in a (P+1)th column comprises a first straight line segment and a first oblique line segment, the first straight line segment extends in the column direction, and the first oblique line segment extends at an angle with respect to the column direction;
the touch line located between the pixel units in the P-th column and the pixel units in the (P+1)th column comprises a second straight line segment and a second oblique line segment, the second straight line segment extends in the column direction, and the second oblique line segment extends at an angle with respect to the column direction;
the orthographic projection of the signal transmission line in the plane where the self-capacitance touch panel is located and the orthographic projection of the touch line in the plane where the self-capacitance touch panel is located satisfy at least one of:
an orthographic projection of the first straight line segment in the plane where the self-capacitance touch panel is located is misaligned with an orthographic projection of the second straight line segment in the plane where the self-capacitance touch panel is located, or
an orthographic projection of the first oblique line segment in the plane where the self-capacitance touch panel is located is misaligned with an orthographic projection of the second oblique line segment in the plane where the self-capacitance touch panel is located; and
P is a positive integer.

2. The self-capacitance touch panel according to claim 1, wherein
the touch wiring layer comprises the plurality of touch units arranged in M rows and N columns, and the signal transmission wiring layer comprises M*N signal transmission lines extending in the column direction;
M touch units in a column correspond to M signal transmission lines, one of the M signal transmission lines is electrically connected with the touch lines of a corresponding one of the M touch units in the column, remaining signal transmission lines of the M signal transmission lines are electrically insulated from the touch lines of the corresponding touch unit;
at least a portion of orthographic projections of the remaining signal transmission lines in the plane where the self-capacitance touch panel is located are misaligned with an orthographic projection of each of the touch lines of the corresponding touch unit in the plane where the self-capacitance touch panel is located; and M and N are positive integers greater than or equal to 2, respectively.

3. A display apparatus, comprising the self-capacitance touch panel according to claim 2.

4. The self-capacitance touch panel according to claim 1, wherein the plurality of signal transmission lines and the plurality of touch lines are made of molybdenum.

5. A display apparatus, comprising the self-capacitance touch panel according to claim 1.

6. A self-capacitance touch panel, comprising:
a touch wiring layer;
a signal transmission wiring layer; and
a plurality of pixel units arranged in an array, wherein
the touch wiring layer comprises a plurality of touch units arranged in an array, and each of the touch units comprises a plurality of touch lines electrically connected together;
the signal transmission wiring layer comprises a plurality of signal transmission lines extending in a row direction or a column direction, and at least one of the signal transmission lines is electrically connected with a corresponding one of the touch units and electrically insulated from the rest of the touch units in an extending direction thereof;
at least a portion of an orthographic projection of the signal transmission line in a plane where the self-capacitance touch panel is located is misaligned with an orthographic projection of each of the touch lines of the touch units electrically insulated from the signal transmission line in the plane where the self-capacitance touch panel is located;
an orthographic projection of each of the touch lines in the plane where the self-capacitance touch panel is located is located between orthographic projections of corresponding adjacent pixel units in the plane where the self-capacitance touch panel is located;
an orthographic projection of each of the signal transmission lines in the plane where the self-capacitance touch panel is located is located between orthographic projections of corresponding adjacent pixel units in the plane where the self-capacitance touch panel is located;
the touch unit comprises the touch lines between multiple of the plurality of pixel units;
the signal transmission lines extend in the row direction, the signal transmission line located between the pixel units in a Qth row and the pixel units in a (Q+1)th row comprises a first straight line segment and a first oblique line segment, the first straight line segment extends in the row direction, and the first oblique line segment extends at an angle with respect to the row direction;
the touch line located between the pixel units in the Q-th row and the pixel units in the (Q+1)th row comprises a second straight line segment and a second oblique line segment, the second straight line segment extends in the row direction, and the second oblique line segment extends at an angle with respect to the row direction;
the orthographic projection of the signal transmission line in the plane where the self-capacitance touch panel is located and the orthographic projection of the touch line in the plane where the self-capacitance touch panel is located satisfy at least one of:
an orthographic projection of the first straight line segment in the plane where the self-capacitance touch panel is located is misaligned with an orthographic projection of the second straight line segment in the plane where the self-capacitance touch panel is located, or
an orthographic projection of the first oblique line segment in the plane where the self-capacitance touch panel is located is misaligned with an orthographic projection of the second oblique line segment in the plane where the self-capacitance touch panel is located; and
Q is a positive integer.

7. The self-capacitance touch panel according to claim 6, wherein
the touch wiring layer comprises the plurality of touch units arranged in M rows and N columns, and the signal transmission wiring layer comprises M*N signal transmission lines extending in the row direction;
N touch units in a row correspond to N signal transmission lines, one of the N signal transmission lines is electrically connected with the touch lines of a corresponding one of the N touch units in the row, remaining signal transmission lines of the N signal transmission lines are electrically insulated from the touch lines of the corresponding touch unit;
at least a portion of orthographic projections of the remaining signal transmission lines in the plane where the self-capacitance touch panel is located are misaligned with an orthographic projection of each of the touch lines of the corresponding touch unit in the plane where the self-capacitance touch panel is located; and
M and N are positive integers greater than or equal to 2, respectively.

8. A display apparatus, comprising the self-capacitance touch panel according to claim 7.

9. The self-capacitance touch panel according to claim 6, wherein the plurality of signal transmission lines and the plurality of touch lines are made of molybdenum.

10. A display apparatus, comprising the self-capacitance touch panel according to claim 6.

* * * * *